(12) United States Patent
King et al.

(10) Patent No.: US 11,900,216 B2
(45) Date of Patent: Feb. 13, 2024

(54) SYSTEMS AND METHODS FOR HYBRID ALGORITHMS USING CLUSTER CONTRACTION

(71) Applicant: D-WAVE SYSTEMS INC., Burnaby (CA)

(72) Inventors: James A. King, Vancouver (CA); William W. Bernoudy, Vancouver (CA); Kelly T. R. Boothby, Vancouver (CA); Pau Farré Pérez, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 0 days.

(21) Appl. No.: 17/988,250

(22) Filed: Nov. 16, 2022

(65) Prior Publication Data
US 2023/0169378 A1    Jun. 1, 2023

Related U.S. Application Data

(63) Continuation of application No. 16/741,208, filed on Jan. 13, 2020, now Pat. No. 11,537,926.
(Continued)

(51) Int. Cl.
*G06N 10/00* (2022.01)
*G06F 17/18* (2006.01)
(Continued)

(52) U.S. Cl.
CPC ............. *G06N 10/00* (2019.01); *G06F 17/18* (2013.01); *G06F 18/217* (2023.01); *G06F 18/23213* (2023.01)

(58) Field of Classification Search
CPC ........ G06N 10/00; G06N 20/20; G06N 5/003; G06F 17/18; G06K 9/6223; G06K 9/6262
See application file for complete search history.

(56) References Cited

U.S. PATENT DOCUMENTS

| 1,102,227 A | 7/1914 | Baird |
| 7,135,701 B2 | 11/2006 | Amin et al. |

(Continued)

FOREIGN PATENT DOCUMENTS

| KR | 20160132943 A | 11/2016 |
| KR | 20180067006 A | 6/2018 |

(Continued)

OTHER PUBLICATIONS

Ajagekar, et al., "Quantum computing for energy systems optimization: Challenges and opportunities" May 2, 2019, 34 pages.
(Continued)

*Primary Examiner* — Stacy Whitmore
(74) *Attorney, Agent, or Firm* — Cozen O'Connor

(57) ABSTRACT

Systems and methods are described for operating a hybrid computing system using cluster contraction for converting large, dense input to reduced input that can be easily mapped into a quantum processor. The reduced input represents the global structure of the problem. Techniques involve partitioning the input variables into clusters and contracting each cluster. The input variables can be partitioned using an Unweighted Pair Group Method with Arithmetic Mean algorithm. The quantum processor returns samples based on the reduced input and the samples are expanded to correspond to the original input.

12 Claims, 12 Drawing Sheets

Related U.S. Application Data

(60) Provisional application No. 62/860,972, filed on Jun. 13, 2019, provisional application No. 62/841,533, filed on May 1, 2019, provisional application No. 62/793,694, filed on Jan. 17, 2019.

(51) Int. Cl.
*G06F 18/21* (2023.01)
*G06F 18/23213* (2023.01)

(56) References Cited

U.S. PATENT DOCUMENTS

| | | | |
|---|---|---|---|
| 7,369,035 B2 | 5/2008 | Konno et al. | |
| 7,398,162 B2 | 7/2008 | Downs et al. | |
| 7,398,163 B2 | 7/2008 | Tsukamoto et al. | |
| 7,418,283 B2 | 8/2008 | Amin | |
| 7,533,068 B2 | 5/2009 | Maassen et al. | |
| 7,619,437 B2 | 11/2009 | Thom et al. | |
| 7,624,088 B2 | 11/2009 | Johnson et al. | |
| 7,639,035 B2 | 12/2009 | Berkley | |
| 7,870,087 B2 | 1/2011 | MacReady et al. | |
| 7,870,523 B1 | 1/2011 | Uziel et al. | |
| 7,876,248 B2 | 1/2011 | Berkley et al. | |
| 7,898,282 B2 | 3/2011 | Harris et al. | |
| 7,984,012 B2 | 7/2011 | Coury et al. | |
| 8,008,942 B2 | 8/2011 | Van et al. | |
| 8,035,540 B2 | 10/2011 | Berkley et al. | |
| 8,063,657 B2 | 11/2011 | Rose | |
| 8,073,808 B2 | 12/2011 | Rose | |
| 8,175,995 B2 | 5/2012 | Amin | |
| 8,190,548 B2 | 5/2012 | Choi | |
| 8,195,596 B2 | 6/2012 | Rose et al. | |
| 8,195,726 B2 | 6/2012 | MacReady et al. | |
| 8,283,943 B2 | 10/2012 | Van Den Brink et al. | |
| 8,421,053 B2 | 4/2013 | Bunyk et al. | |
| 8,437,818 B1 | 5/2013 | Tolpygo et al. | |
| 8,464,542 B2 | 6/2013 | Hilton et al. | |
| 8,494,993 B2 | 7/2013 | Harris et al. | |
| 8,772,759 B2 | 7/2014 | Bunyk et al. | |
| 9,170,278 B2 | 10/2015 | Neufeld | |
| 9,178,154 B2 | 11/2015 | Bunyk | |
| 9,183,508 B2 | 11/2015 | King | |
| 9,501,747 B2 | 11/2016 | Roy | |
| 9,875,444 B2 | 1/2018 | King | |
| 9,898,689 B2 | 2/2018 | Shamaie | |
| 10,031,887 B2 | 7/2018 | Raymond | |
| 10,169,445 B2 | 1/2019 | Weinstein et al. | |
| 10,268,622 B2 | 4/2019 | Hilton et al. | |
| 10,346,508 B2 | 7/2019 | Amin et al. | |
| 10,552,755 B2 | 2/2020 | Lanting et al. | |
| 10,599,988 B2 | 3/2020 | Thom et al. | |
| 10,846,366 B1 | 11/2020 | Otterbach et al. | |
| 11,062,227 B2 | 7/2021 | Amin et al. | |
| 11,194,573 B1 | 12/2021 | Smith | |
| 11,288,121 B2 | 3/2022 | Katabarw | |
| 11,481,354 B2 | 10/2022 | Ozfidan | |
| 2002/0163518 A1 | 11/2002 | Rising et al. | |
| 2003/0121028 A1 | 6/2003 | Coury et al. | |
| 2003/0169041 A1 | 9/2003 | Coury et al. | |
| 2005/0224784 A1 | 10/2005 | Amin et al. | |
| 2006/0225165 A1 | 10/2006 | Maassen et al. | |
| 2007/0174227 A1 | 7/2007 | Johnson et al. | |
| 2007/0239366 A1 | 10/2007 | Hilton et al. | |
| 2008/0065573 A1 | 3/2008 | MacReady | |
| 2008/0109500 A1 | 5/2008 | MacReady et al. | |
| 2008/0116449 A1 | 5/2008 | MacReady et al. | |
| 2008/0176750 A1 | 7/2008 | Rose et al. | |
| 2008/0218519 A1 | 9/2008 | Coury et al. | |
| 2008/0313430 A1 | 12/2008 | Bunyk | |
| 2009/0070402 A1 | 3/2009 | Rose et al. | |
| 2009/0075825 A1 | 3/2009 | Rose et al. | |
| 2009/0077001 A1 | 3/2009 | MacReady et al. | |
| 2009/0232191 A1 | 9/2009 | Gupta et al. | |
| 2009/0299947 A1 | 12/2009 | Amin et al. | |
| 2010/0275206 A1 | 10/2010 | Mewhinney et al. | |
| 2010/0281885 A1 | 11/2010 | Black et al. | |
| 2011/0022820 A1 | 1/2011 | Bunyk et al. | |
| 2011/0060710 A1 | 3/2011 | Amin | |
| 2011/0065585 A1 | 3/2011 | Lanting et al. | |
| 2011/0231462 A1 | 9/2011 | MacReady et al. | |
| 2011/0238378 A1* | 9/2011 | Allen | G06N 10/00 702/186 |
| 2011/0298489 A1 | 12/2011 | Van et al. | |
| 2013/0117200 A1 | 5/2013 | Thom | |
| 2013/0282636 A1 | 10/2013 | MacReady et al. | |
| 2014/0025606 A1 | 1/2014 | MacReady | |
| 2014/0187427 A1 | 7/2014 | MacReady et al. | |
| 2014/0214257 A1 | 7/2014 | Williams et al. | |
| 2014/0337612 A1 | 11/2014 | Williams | |
| 2014/0344322 A1* | 11/2014 | Ranjbar | G06F 17/11 708/270 |
| 2015/0269124 A1 | 9/2015 | Hamze et al. | |
| 2015/0297949 A1 | 10/2015 | Aman et al. | |
| 2015/0310350 A1 | 10/2015 | Niskanen et al. | |
| 2015/0358022 A1 | 12/2015 | McDermott et al. | |
| 2015/0363708 A1 | 12/2015 | Amin et al. | |
| 2016/0055421 A1 | 2/2016 | Adachi et al. | |
| 2016/0071021 A1 | 3/2016 | Raymond | |
| 2016/0321559 A1 | 11/2016 | Rose et al. | |
| 2017/0091650 A1 | 3/2017 | King | |
| 2017/0124027 A1 | 5/2017 | Zaribafiyan et al. | |
| 2017/0177534 A1 | 6/2017 | Mohseni et al. | |
| 2017/0178017 A1 | 6/2017 | Roy et al. | |
| 2017/0220510 A1 | 8/2017 | Hilton et al. | |
| 2017/0255629 A1 | 9/2017 | Thom et al. | |
| 2017/0255872 A1 | 9/2017 | Hamze et al. | |
| 2017/0300817 A1 | 10/2017 | King et al. | |
| 2017/0323195 A1 | 11/2017 | Crawford et al. | |
| 2018/0046933 A1 | 2/2018 | La Cour et al. | |
| 2018/0091440 A1 | 3/2018 | Dadashikelayeh et al. | |
| 2018/0096085 A1 | 4/2018 | Rubin | |
| 2018/0218279 A1 | 8/2018 | Lechner et al. | |
| 2018/0246848 A1 | 8/2018 | Douglass et al. | |
| 2018/0246851 A1 | 8/2018 | Zaribafiyan et al. | |
| 2018/0260245 A1 | 9/2018 | Smith | |
| 2018/0336166 A1 | 11/2018 | Forster | |
| 2018/0365585 A1 | 12/2018 | Smith et al. | |
| 2019/0019101 A1 | 1/2019 | Neven | |
| 2019/0164059 A1 | 5/2019 | Denchev et al. | |
| 2019/0164076 A1 | 5/2019 | Kim et al. | |
| 2020/0005186 A1 | 1/2020 | Romero et al. | |
| 2020/0026551 A1 | 1/2020 | Ducore et al. | |
| 2020/0027029 A1 | 1/2020 | Linvill | |
| 2020/0073739 A1 | 3/2020 | Rungta et al. | |
| 2020/0089832 A1 | 3/2020 | Shao et al. | |
| 2020/0117511 A1 | 4/2020 | Reinhardt | |
| 2020/0134502 A1 | 4/2020 | Anschuetz et al. | |
| 2020/0175413 A1 | 6/2020 | Hsu et al. | |
| 2020/0226197 A1 | 7/2020 | Woerner et al. | |
| 2020/0234172 A1 | 7/2020 | King et al. | |
| 2020/0302306 A1 | 9/2020 | Matsuo et al. | |
| 2020/0311591 A1 | 10/2020 | Bernoudy et al. | |
| 2021/0056003 A1 | 2/2021 | Stevanovic | |
| 2021/0097776 A1 | 4/2021 | Faulkner et al. | |
| 2021/0334081 A1 | 10/2021 | Chong et al. | |
| 2021/0357797 A1 | 11/2021 | Karalekas et al. | |
| 2022/0019928 A1 | 1/2022 | Jiang et al. | |

FOREIGN PATENT DOCUMENTS

| | | |
|---|---|---|
| WO | 2005093649 A1 | 10/2005 |
| WO | 2007085074 A1 | 8/2007 |
| WO | 2009152180 A2 | 12/2009 |
| WO | 2012064974 A2 | 5/2012 |
| WO | 2013006836 A1 | 1/2013 |
| WO | 2015143439 A1 | 9/2015 |
| WO | 2017214331 A1 | 12/2017 |
| WO | 2018119522 A1 | 7/2018 |

(56) References Cited

FOREIGN PATENT DOCUMENTS

| WO | 2021126773 A1 | 6/2021 |
| WO | 2022219399 A1 | 10/2022 |

OTHER PUBLICATIONS

Amin, "Effect of Local Minima on Adiabatic Quantum Optimization," Physical Review Letters 100(130503), 2008, 4 pages.

B. Bauer et al., "Hybrid Quantum Classical Approach to Correlated Materials", arXiv.1510.03859V2, Aug. 29, 2016.

Booth, M. et al., "Partitioning Optimization Problems for Hybrid Classical/Quantum Execution," D-Wave Technical Report, Jan. 9, 2017, 13 pages.

Congram et al., "An Iterated Dynasearch Algorithm for the Single-Machine Total Weighted Tardiness Scheduling Program," INFORMS Journal on Computing, vol. 14, No. 1, 2022 (17 pages).

E. Blanzieri et al., "Quantum Annealing Tabu Search for QUBO Optimization", arXiv.1810.09342V1, Oct. 22, 2018.

Goldman, et al., "Parameter-less Population Population Pyramid", Beacon Center for the Study of evolution in Action, 2014, pp. 785-792.

Hamerly, et al., "Scaling advantages of all-to-all connectivity in physical annealers" the Coherent Ising Machine vs. D-Wave 2000Q, ArXiv:1805.052217v1 [quant-ph], May 14, 2018, 17 pages.

Inoue et al, "Simulation and Experimental Demonstration of Logic Circuits Using an Ultra-Low-Power Adiabatic Quantum-Flux-Parametron," in IEEE Transactions on Applied Superconductivity, vol. 23, No. 3, pp. 1301105-1301105, Jun. 2013.

International Search Report and Written Opinion for PCT/IB2022/000201 dated Sep. 8, 2022, 15 pages.

International Search Report and Written Opinion for PCT/US2020/013366, dated May 7, 2020, 9 pages.

Wocjan, Pawel, and Anura Abeyesinghe. "Speedup via quantum sampling." Physical Review A 78.4 (2008): 042336.

Katzgraber et al., "A small-world search for quantum speedup: How small-world interactions can lead to improved quantum annealers designs", arXiv:1805.09510v1 [quant-ph], May 4, 2018, 11 pages.

Non Final Office Action for U.S. Appl. No. 17/739,411, dated Nov. 9, 2022, 12 pages.

Non-Final Office Action Issued in U.S. Appl. No. 16/601,097 dated Apr. 8, 2022, 22 pages.

Non-Final Office Action Issued in U.S. Appl. No. 16/997,252 dated May 26, 2022, 13 pages.

Non-Final Office Action dated Jun. 3, 2022 in U.S. Appl. No. 16/741,208.

Notice of Allowance for U.S. Appl. No. 16/601,097, dated Nov. 2, 2022, 9 pages.

Notice of Allowance for U.S. Appl. No. 16/830,650, dated Jul. 15, 2022, 11 pages.

Notice of Allowance dated Feb. 2, 2022, for Thom, "Systems and Methods for Analog Processing of Problem Graphs Having Arbitrary Size and/or Connectivity" U.S. Appl. No. 16/778,295; 29 pages.

O. A. Mukhanov, "Energy-Efficient Single Flux Quantum Technology," in IEEE Transactions on Applied Superconductivity, vol. 21, No. 3, pp. 760-769, Jun. 2011, doi: 10.1109/TASC.2010.2096792.

Pastorello, D. et al., "Quantum Annealing Learning Search for Solving QUBO Problems," arXiv:1810.09342v3 [quant-ph] Aug. 13, 2019, 17 pages.

S. R. Ekanayake, T. Lehmann, A. S. Dzurak and R. G. Clark, "Quantum bit controller and observer circuits in SOS-CMOS technology for gigahertz low-temperature operation," 2007 7th IEEE Conference on Nanotechnology (IEEE Nano), 2007, pp. 1283-1287.

Thierens, "The Linkage Tree Genetic Algorithm", R. Schaefer et al. (Eds.): PPSN XI, Part I, LNCS 6238, pp. 264-273, Springer-Verlag Berlin Heidelberg 2010.

Tran, T. et al., "A Hybrid Quantum-Classical Approach to Solving Scheduling Problems," Proceedings of the Ninth International Symposium on Combinational Search, 2016, 9 pages.

Williams, "Systems and Methods for Interacting With a Quantum Computing System," U.S. Appl. No. 61/811,457, filed Apr. 12, 2013, 55 pages.

Notice of Allowance for U.S. Appl. No. 17/739,411, dated Mar. 1, 2023, 9 pages.

Bass, G. et al, "Heterogeneous Quantum Computing for Satellite Constellation Optimization: Solving the Weighted K-Clique Problem", arXiv:1709.05381v3, May 20, 2018. 17 pages.

Final Office Action dated Dec. 9, 2022 for U.S. Appl. No. 16/997,252 in 11 pages.

Kingma et al., "Adam: A method for stochastic optimization", arXiv:1412.6980 Jan. 30, 2017. https://arxiv.org/abs/1412.6980.

Neal, "Slice Sampling", The Annals of Statistics, 2003, vol. 31, No. 3, p. 705-767.

Rios, et al., "Derivative-free optimization: a review of algorithms and comparison of software implementations". Springer Science+Business Media, LLC. 2012, J Glob Optim (2013) 56:1247-1293.

Spall, "A Stochastic Approximation Technique for Generating Maximum Likelihood Parmeter Estimates", Proceedings of the 1987 American Control Conference, Minneapolis, Jun. 10-12, 1987.

Spall, "An Overview of the Simultaneous Perturbation Method for Efficient Optimization", Johns Hopkins APL Technical Digest, vol. 9, No. 4, pp. 482-492, 1998.

Spall, "Multivariate Stochastic Approximation Using a Simultaneous Perturbation Gradient Approximation," IEEE Transactions on Automatic Control 37(3):332-341, 1992.

* cited by examiner

«SYSTEMS AND METHODS FOR HYBRID ALGORITHMS USING CLUSTER CONTRACTION»

FIELD

This disclosure generally relates to systems and methods for solving computational problems in hybrid computational systems employing a quantum processor and a classical processor.

BACKGROUND

Quantum Annealing

Quantum annealing is a computational method that may be used to find a low-energy state of a system, typically preferably the ground state of the system. The method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing.

A quantum processor may be designed to perform quantum annealing and/or adiabatic quantum computation. An evolution Hamiltonian can be constructed that is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and $A(t)$, $B(t)$ are coefficients that can control the rate of evolution, and typically lie in the range [0,1].

A particular example is realized by an implementation of superconducting qubits.

Markov Chain Monte Carlo

Markov Chain Monte Carlo (MCMC) is a class of computational techniques which include, for example, simulated annealing, parallel tempering, population annealing, and other techniques. A Markov chain may be used, for example when a probability distribution cannot be used. A Markov chain may be described as a sequence of discrete random variables, and/or as a random process where at each time step the state only depends on the previous state. When the chain is long enough, aggregate properties of the chain, such as the mean, can match aggregate properties of a target distribution.

The Markov chain can be obtained by proposing a new point according to a Markovian proposal process (generally referred to as an "update operation"). The new point is either accepted or rejected. If the new point is rejected, then a new proposal is made, and so on. New points that are accepted are ones that make for a probabilistic convergence to the target distribution. Convergence is guaranteed if the proposal and acceptance criteria satisfy detailed balance conditions and the proposal satisfies the ergodicity requirement. Further, the acceptance of a proposal can be done such that the Markov chain is reversible, i.e., the product of transition rates over a closed loop of states in the chain is the same in either direction. A reversible Markov chain is also referred to as having detailed balance. Typically, in many cases, the new point is local to the previous point.

Quadratic Unconstrained Binary Optimization Problems

Quadratic Unconstrained Binary Optimization (QUBO) problems are traditionally used in computer science. Variables are TRUE and FALSE, states that correspond to 1 and 0 values.

A QUBO problem is defined using an upper-diagonal matrix Q, which is an N×N upper-triangular matrix of real weights, and x, a vector of binary variables, as minimizing the function $$f(x) = \sum_i Q_{i,i} x_i + \sum_{i<j} Q_{i,j} x_i x_j$$

where the diagonal terms $Q_{i,i}$ are the linear coefficients and the nonzero off-diagonal terms are the quadratic coefficients $Q_{i,j}$.

This can be expressed more concisely as $$\min_{x \in \{0,1\}^n} x^T Q x.$$

In scalar notation, the objective function expressed as a QUBO is as follows:

$$E_{qubo}(a_i, b_{i,j}; q_i) = \sum_i a_i q_i + \sum_{i<j} b_{i,j} q_i q_j$$

Quadratic unconstrained binary optimization problems are unconstrained in that there are no constraints on the variables other than those expressed in Q.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

A method of operation of a hybrid computing system is described. The hybrid computing system comprises a quantum processor and a classical processor. The method includes applying an algorithm to a problem having an input with n population variables via the classical processor; converting the input with n population variables to a reduced input with k population variables, where k≤n, via the classical processor; obtaining samples $S_r$ from the reduced input via the quantum processor; and expanding the samples $S_r$ to obtain a set of modified states to the problem via the classical processor. The algorithm applied to the problem having an input with n variables via the classical processor may be a parallel tempering algorithm. The n population variables may be partitioned into k clusters and each of the k clusters may be contracted to produce a reduced input with k population variables. The clusters may be contracted relative to a low-energy state s, or in a possibly non-deterministic manner based on a set of low-energy states $S_c$, and expanded to undo contractions, or they may be expanded in a possibly non-deterministic process according to the contractions made, the correlations or mutual energies observed in $S_c$, and the energy function $f$, or the restriction of $f$ to the variables within each cluster. The values of all population variable in a cluster in the state s may be clamped relative to each other to contract the cluster. The n population variables may be partitioned using a low-energy subset of states. The values of the population variables may be averaged relative the low-energy subset of states in each cluster to contract each of the k clusters. The n population variables can be partitioned into clusters using an Unweighted Pair Group Method with Arithmetic Mean algorithm. Pairwise entropy may be used as a distance metric in the Unweighted Pair Group Method with Arithmetic Mean algorithm. A new state s may be created based on the clustering to contract each of the k clusters. A heuristic solver may be used to create the new state s. An embedding algorithm may be applied to the problem with the reduced input before obtaining samples from the quantum processor. The method may be iteratively repeated until an exit condition is met. An exit condition may be a satisfactory measure of the quality of the population variables.

A hybrid computing system is described. The hybrid computing system comprises a quantum processor and a classical processor. The classical processor operable to: apply an algorithm to a problem having an input with n population variables; convert the input with n population variables to a reduced input with k population variables, where k≤n; obtain samples $S_r$ from the reduced input from the quantum processor; and expand the samples $S_r$ to obtain a set of modified states to the problem. The algorithm may be a parallel tempering algorithm. The classical processor may partition the n population variables into k clusters and contract each of the k cluster to produce a reduced input with k variables. Each of the k clusters may be contracted relative to a low-energy state s, or in a possibly non-deterministic manner based on a set of low-energy states $S_c$. The samples $S_r$ may be expanded to undo contractions, or they may be expanded in a possibly non-deterministic process according to the contractions made, the correlations or mutual energies observed in $S_c$, and the energy function $f$, or the restriction of $f$ to the variables within each cluster. The population variables in a cluster may be clamped relative to each other based on their value in the state s. The n population variables may be partitioned into k clusters using a low-energy subset of states. The values of all the population variables may be averaged relative the low-energy subset of states in each cluster. The n population variables may be partitioned into k clusters via an Unweighted Pair Group Method with Arithmetic Mean algorithm. Pairwise entropy may be used as a distance metric in the Unweighted Pair Group Method with Arithmetic Mean algorithm. The classical processor may be operable to embed the problem with the reduced input via an embedding algorithm before obtaining samples $S_r$ from the reduced input from the quantum processor.

A method of operation of a hybrid computing system is described. The hybrid computing system comprises a quantum processor and a classical processor. The method includes generating a plurality of variable modification proposals relative to a state s on a problem via the classical processor; formulating a Quadratic Unconstrained Binary Optimization problem corresponding to the energy change of accepting a subset of the plurality of variable modification proposals via the classical processor; and solving the Quadratic Unconstrained Binary Optimization problem via the quantum processor. The problem may be a Quadratic Constrained Binary Optimization problem or an Integer Quadratic Programming problem. The method may generate a plurality of variable modification proposals relative to a random state s. The plurality of variable modification problems may be such that no two proposals modify the same variable and no more than two proposals impact a term of the Quadratic Unconstrained Binary Optimization problem's cost function. The method may further include modifying the state s by accepting the subset of the plurality of variable modification proposals specified by solving the Quadratic Unconstrained Binary Optimization problem; and iteratively repeating, until an exit condition has been met: generating a plurality of variable modification proposals relative to a state $s_{n-1}$ via the classical processor; formulating a Quadratic Unconstrained Binary Optimization problem corresponding to the energy change of accepting a subset of the variable modification proposals via the classical processor; solving the Quadratic Unconstrained Binary Optimization problem via the quantum processor; and modifying the state $s_{n-1}$ to a state $s_n$ by accepting the subset of the proposals specified by solving the Quadratic Unconstrained Binary Optimization problem. The method may further include determining whether the exit condition has been met. The exit condition may one of: a number of iterations and the state $s_n$ satisfying a measure of quality.

A hybrid computing system is described. The hybrid computing system comprises a classical processor and a quantum processor. The classical processor operable to: generate a plurality of variable modification proposals relative to a state s on a problem; formulate a Quadratic Unconstrained Binary Optimization problem corresponding to the energy change of accepting a subset of the plurality of variable modification proposals; and cause the quantum processor to solve the Quadratic Unconstrained Binary Optimization problem. The problem may be one of: a Quadratic Constrained Binary Optimization problem and an Integer Quadratic Programming problem. The state s may be a random state s. The classical processor may be operable to generate a plurality of variable modification proposals so that no two proposals modify the same variable and no more than two proposals impact a term of the Quadratic Unconstrained Binary Optimization problem's cost function. The classical processor may be further operable to modify the state s by accepting the subset of the plurality of variable modification proposals specified by solving the Quadratic Unconstrained Binary Optimization problem; and iteratively repeat, until an exit condition has been met: generate a plurality of variable modification proposals relative to a state $s_{n-1}$; formulate a Quadratic Unconstrained Binary Optimization problem corresponding to the energy change of accepting a subset of the variable modification proposals; cause the quantum processor to solve the Quadratic Unconstrained Binary Optimization problem; and modify the state $s_{n-1}$ to a state $s_n$ by accepting the subset of the proposals specified by solving the Quadratic Unconstrained Binary Optimization problem. The classical processor may be further operable to determine whether the exit condition has been met. The classical processor may be operable to determine whether one of a group of exit conditions comprising: an elapsed number of iterations and the state $s_n$ satisfying a measure of quality, has been met.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any infor- FIG. 1 is a schematic diagram of an example hybrid computing system comprising a quantum processor and a classical processor.

DETAILED DESCRIPTION

Figure 1:
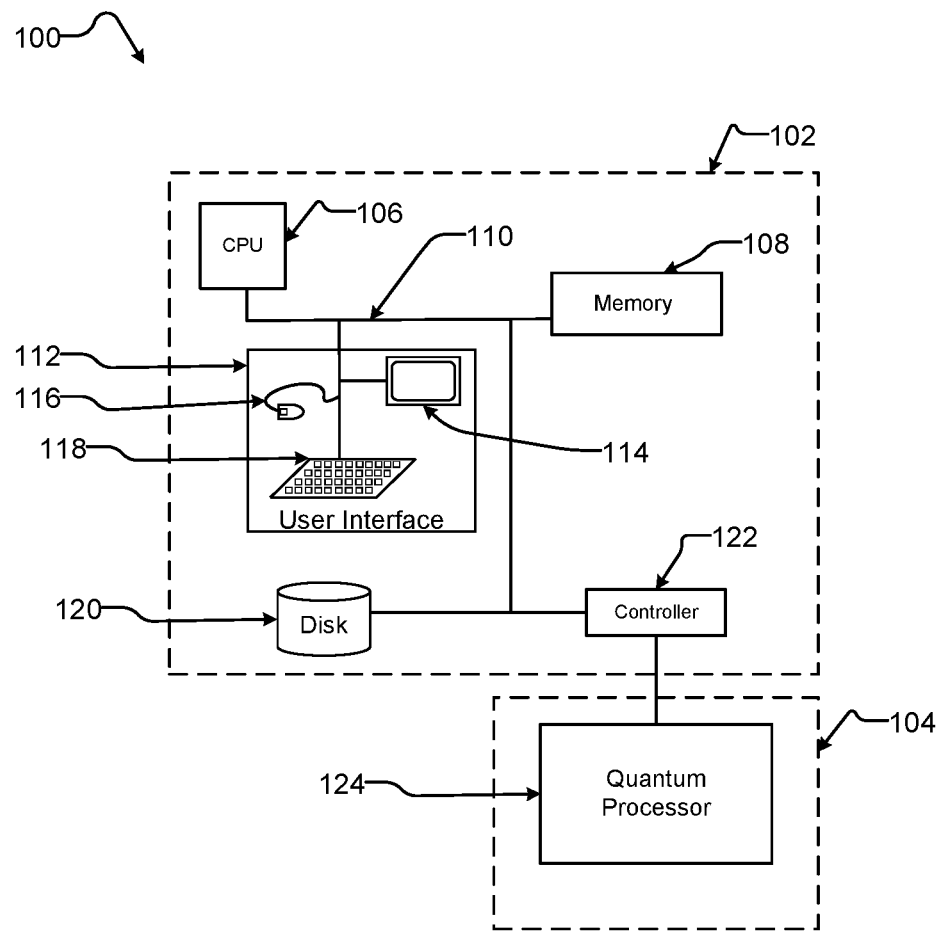

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification and the appended claims, the terms 'sample', 'sampling', 'sample generator' are intended to have their corresponding meaning in the fields of statistics and electrical engineering. In statistics, a sample is a subset of a population, for example an individual datum, data point, object, or a subset of data, data points or objects. In electrical engineering, sampling refers to collecting a plurality of measurements of a physical system, for example an analog signal. Throughout this specification and the appended claims, the terms 'average', 'averaging', 'averaged' are intended, but not limited, to have their corresponding meaning in the field of statistic and arithmetic. In the field of statistic an average value may refer to, for example, mean, median and mode, while in the field of arithmetic an average value may refer to the arithmetic mean.

A hybrid computing system can draw samples from an analog processor. The analog processor can be configured to provide samples from a statistical distribution, thus becoming a sample generator. An example of a processor that can be operated as a sample generator is a quantum processor designed to perform quantum annealing, where each sample corresponds to a state of the processor and the population corresponds to a set of states drawn from the processor.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

FIG. 1 illustrates a hybrid computing system 100 including a classical computer 102 coupled to a quantum computer 104. The example classical computer 102 includes a digital processor (CPU) 106 that may be used to perform classical digital processing tasks, and hence is denominated herein and in the claims as a classical processor.

Classical computer 102 may include at least one digital processor (such as central processor unit 106 with one or more cores), at least one system memory 108, and at least one system bus 110 that couples various system components, including system memory 108 to central processor unit 106. The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc.

Classical computer 102 may include a user input/output subsystem 112. In some implementations, the user input/output subsystem includes one or more user input/output components such as a display 114, mouse 116, and/or keyboard 118.

System bus 110 can employ any known bus structures or architectures, including a memory bus with a memory controller, a peripheral bus, and a local bus. System memory 108 may include non-volatile memory, such as read-only memory ("ROM"), static random-access memory ("SRAM"), Flash NANO; and volatile memory such as random access memory ("RAM") (not shown).

Classical computer 102 may also include other non-transitory computer or processor-readable storage media or non-volatile memory 120. Non-volatile memory 120 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 120 may communicate with the digital processor via system bus 110 and may include appropriate interfaces or controllers 122 coupled to system bus 110. Non-volatile memory 120 may serve as long-term storage for processor- or computer-readable instructions, data structures, or other data (sometimes called program modules) for classical computer 102.

Although classical computer 102 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory, or a solid-state disk that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the classical computer 102 and quantum computer 104. For example, the system memory 108 may store processor- or computer-readable instructions, data structures, or other data which, when executed by a processor or computer causes the processor(s) or computer(s) to execute one, more or all of the acts of the methods 200 (FIG. 2), 300 (FIG. 3), 400 (FIG. 4), 500 (FIG. 5), 600 (FIG. 6), 700 (FIG. 7), 800 (FIG. 8), 900 (FIG. 9), 1000 (FIG. 10), 1100 (FIG. 11) and 1200 (FIG. 12).

In some implementations system memory 108 may store processor- or computer-readable calculation instructions to perform pre-processing, co-processing, and post-processing to quantum computer 104. System memory 108 may store at set of quantum computer interface instructions to interact with the quantum computer 104.

Quantum computer 104 may include one or more quantum processors such as quantum processor 124. Quantum computer 104 can be provided in an isolated environment, for example, in an isolated environment that shields the internal elements of the quantum computer from heat, magnetic field, and other external noise (not shown). Quantum processor 124 include programmable elements such as qubits, couplers and other devices. In accordance with the present disclosure, a quantum processor, such as quantum processor 124, may be designed to perform quantum annealing and/or adiabatic quantum computation. Example of quantum processor are described in U.S. Pat. No. 7,533,068.

A hybrid computing system, for example hybrid computing system 100, may be used for problems that are hard to map or cannot fit into the topology of a quantum processor. An example of problems that are not easily mapped to a quantum processor, for example due to insufficient connectivity of the quantum processor, are problems with large, dense inputs. Such problems may be solved with a classical processor using algorithms such as parallel tempering or population-based methods (e.g., genetic algorithms). However, some algorithms like parallel tempering with Houdayer isoenergetic cluster moves are powerful when applied to sparse input but are not efficient on dense inputs. Current techniques perform no cluster updates or perform a single flip at a time and are, therefore, inefficient when clusters have non-trivial relationship with each other, for example in the case of hard inputs.

Thus, there is need for techniques to reduce inputs that are larger and/or denser than the topology of a quantum processor to inputs that fit the quantum processor and represents the hard, global structure of the problem. The hybrid algorithms described in the present disclosure employ classical resource (e.g., GPUs) to solve the local structure of a problem and a quantum processor to solve the global and harder structure of the problem.

An approach for reducing a problem size is to partition the input variables into clusters that can be contracted, leaving a reduced-input problem that can be solved on a quantum processor. The variables are partitioned so that each variable is in exactly one cluster. Each cluster is then contracted to reduce the original input on n variables, where n may be a very large number, to an input on k variables, where k is the number of clusters in the partition. The value of k can be chosen based on the topology of a quantum processor, for example, k may be the largest number of variables that fit into the topology of the quantum processor. In at least one implementation, the value of k might be equal to n.

For a given state s and a partition of the variables into k clusters, there are $2^k$ ways to flip or not flip the k clusters relative to s. Finding the subset to flip is equivalent to an Ising minimization problem on the reduced input on k variables and can be solved on the quantum processor. The quantum processor then produces a set of samples based on the reduced input and the set of samples can be expanded based on s, or according to other means including but not limited to those described in this document. This approach enables powerful multi-cluster moves that are solving the global structure of the problem, which can be difficult to solve with purely classical methods. For example, classical algorithms that partition variables into clusters, e.g., linkage tree genetic algorithm, only consider basic updates based on clusters, e.g., flipping a single cluster at a time rather than considering all possible ways that k clusters can be flipped.

Figure 2:
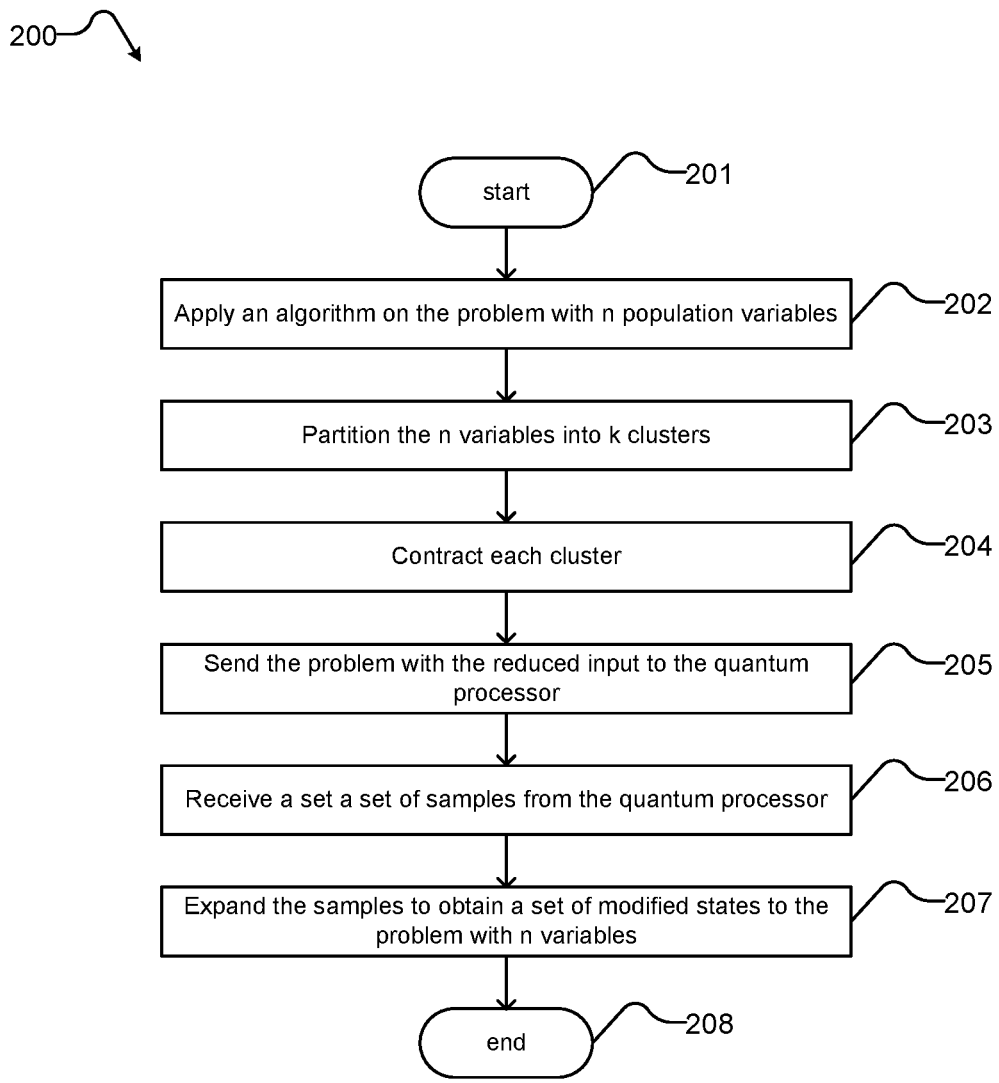
FIG. 2 is a flow diagram of an example method of operation in a hybrid computing system using cluster contraction.

FIG. 2 is a flow diagram of an example method 200 of operation of a hybrid computing system using cluster contraction. Method 200 is executed via a hybrid computing system, comprising a quantum processor and a non-quantum, or classical, processor, for example hybrid computing system 100.

Method 200 comprises acts 201 to 208; however, a person skilled in the art will understand that the number of acts is an example, and, in some implementations, certain acts may be omitted, further acts may be added, and/or the order of the acts may be changed.

Method 200 starts at 201, for example in response to a call from another routine.

At 202, the classical processor applies an algorithm to a problem having n population variables. The problem may be received as part of a set of input at 201. In at least one implementation, a parallel tempering algorithm is applied at 202. The algorithm may be applied for a pre-determined time, for example for a time sufficient to generate states that can be useful for partitioning the n population variables at 203.

At 203, the classical processor partitions the n population variables into k clusters, where k<n, so that each variable is in exactly one cluster. In at least one implementation, k≤n. In some implementations the n population variables are partitioned relative to a subset of low-energy states S, derived from running the algorithm at 202. For example, if a parallel tempering algorithm was applied at 202, the states encountered by the coldest random walks will have the lowest energy; these states will be selected to partition the n population variables. In at least one implementation, an Unweighted Pair Group Method with Arithmetic Mean (UPGMA) algorithm is used to partition the n population variables into k clusters. Pairwise mutual information is an example of a distance metric that can be used in UPGMA; however, other pairwise symmetric metrics or scores can be used. Alternatively, the n population variables are partitioned relative to a low-energy state s of interest.

At 204, the classical processor contracts each of the k clusters, thus reducing the number of population variables and producing a reduced input to the problem of 202. In some implementations, k≤n. In some implementations, the classical processor contracts each cluster by clamping all the variables in a cluster based on their value relative to a state s, therefore obtaining k variables representing a reduced input to the problem of 202. The state s may be determined at 202, or it may be created by the classical processor using a heuristic solver based on the clustering determined at 203. Alternatively, the classical processor contracts each cluster based on a set of states, rather than a single state s, for example by averaging within each cluster, by applying a sampling heuristic to the energy function restricted to a cluster, or a non-deterministic algorithm simulating the correlations or mutual information observed within the set of states.

At 205, the classical processor sends the problem with the reduced input to the quantum processor. In some implementations, an embedding algorithm, for example a minor embedding, is applied to the problem with the reduced input generating an embedded problem that can be sent to the quantum processor.

At 206, the quantum processor returns samples $S_r$ from the reduced input.

At 207, the classical processor expands the samples $S_r$ to obtain a new set of modified states to the original input on n population variables. Where the state s is used at 204 to reduce the input, samples $S_r$ are expanded relative to s by flipping the clusters dictated by the state from $S_r$. In some implementations, samples $S_r$ are expanded based on a set of low-energy states. In these or other implementations, the expansion may additionally take into consider the statistics (such as mutual information, or correlations) observed within the low-energy states, as well as the energy function.

At 208, method 200 terminates, until it is, for example, invoked again.

Figure 3:
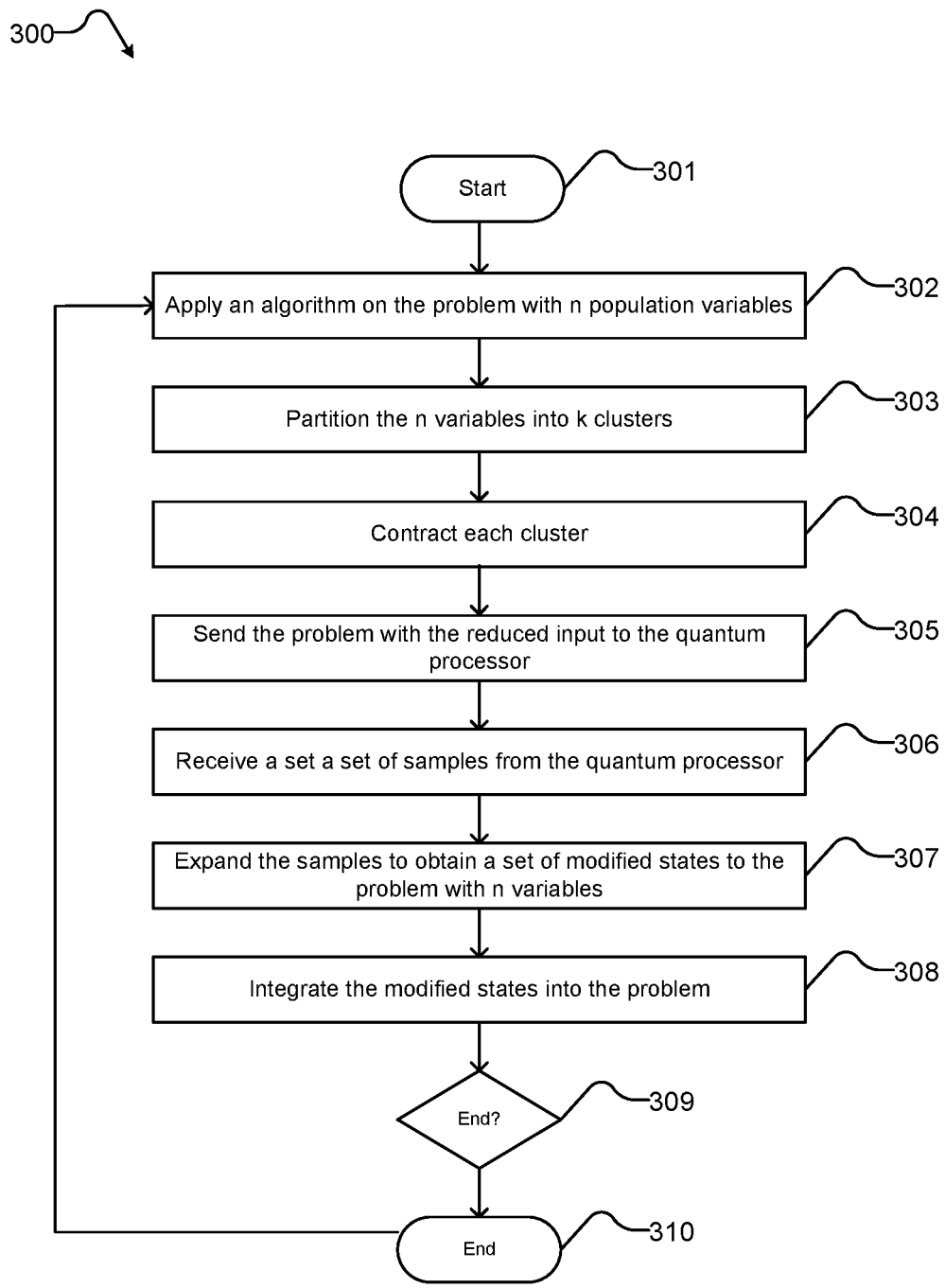
FIG. 3 is a flow diagram of an example iterative method of operation in a hybrid computing system using cluster contraction.

FIG. 3 is a flow diagram of an example iterative method 300 of operation of a hybrid computing system using cluster contraction. Method 300 is executed via a hybrid computing system, comprising a quantum processor and a non-quantum, or classical, processor, for example hybrid computing system 100.

Method 300 comprises acts 301 to 310; however, a person skilled in the art will understand that the number of acts is an example, and, in some implementations, certain acts may be omitted, further acts may be added, and/or the order of the acts may be changed.

Method 300 starts at 301, for example in response to a call from another routine.

At 302, the classical processor applies an algorithm to a problem having n population variables, as described above with reference to act 202 of method 200.

At 303, the classical processor partitions the n population variables into k clusters, as described above with reference to act 203 of method 200.

At 304, the classical processor contracts each of the k clusters, as described above with reference to act 204 of method 200.

At 305, the classical processor sends the problem with the reduced input to the quantum processor.

At 306, the quantum processor returns samples $S_r$ from the reduced input.

At 307, the classical processor expands the samples $S_r$, as described above with reference to act 207 of method 200.

At 308, the classical processor integrates the modified states into the n population variables.

At 309, the classical processor checks if an exit condition has been met. If an exit condition has been met, control passes to 310, otherwise to 302, where an algorithm is again applied to the problem. An exit condition may be determining whether a measure of the quality of the population variables is satisfied.

At 310, method 300 terminates, until it is, for example, invoked again.

Classical computers can generally solve problem with larger input sizes than quantum processor. However, for very large inputs the time to obtain a solution from a classical computer may be too prohibitively long. There is, therefore, need to reduce a problem input size for classical computers. The methods described above may be employed to operate a classical computer or a classical computing system comprising a plurality of classical computers. Additionally, a hybrid computing system can employ the above methods using the classical computer.

An approach for reducing a problem size is to partition the input variables into clusters that can be contracted, leaving a reduced-input problem that can be solved on a quantum processor. The variables are partitioned so that each variable is in exactly one cluster. Each cluster is then contracted to reduce the original input on n variables, where n may be a very large number, to an input on k variables, where k is the number of clusters in the partition. In at least one implementation, the value of k might be equal to n.

For a given state s and a partition of the variables into k clusters, there are $2^k$ ways to flip or not flip the k clusters relative to s. Finding the subset to flip is equivalent to an Ising minimization problem on the reduced input on k variables and can be solved on a classical processor using a classical solver. The term classical solver or classical algorithm is used in the present disclosure and the appended claims to denote a solver or algorithm that uses only classical (i.e., non-quantum) computing resources. Example of classical solvers than can be used is Parallel Tempering and Simulated Annealing. The classical processor then produces a set of samples based on the reduced input and the set of samples can be expanded based on s. In other implementations, the expansion may be based in part on the energy function and/or statistics observed throughout the problem-solving run.

Figure 4:
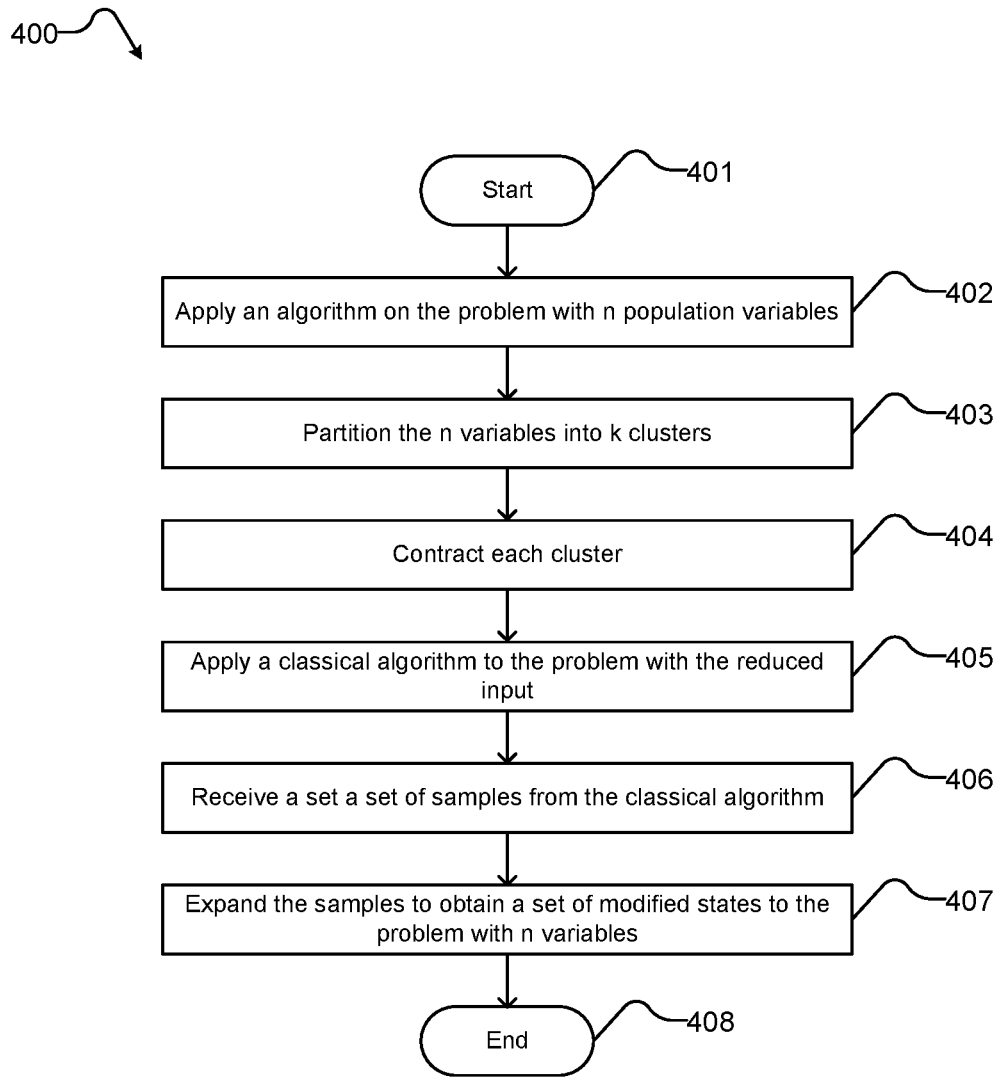
FIG. 4 is a flow diagram of an example method of operation in a classical computer using cluster contraction.

FIG. 4 is a flow diagram of an example method 400 for solving a computational problem using cluster contraction. Method 400 is executed via a classical computing system, comprising at least one non-quantum, or classical, processor. Alternatively, method 400 can be executed via a hybrid computing system, for example hybrid computing system 100, using the classical processor. Method 400 comprises acts 401 to 408; however, a person skilled in the art will understand that the number of acts is an example, and, in some implementations, certain acts may be omitted, further acts may be added, and/or the order of the acts may be changed.

Method 400 starts at 401, for example in response to a call from another routine.

At 402, the classical processor applies an algorithm to a problem having n population variables. The problem may be received as part of a set of input at 401. In at least one implementation, a parallel tempering algorithm is applied at 402. The algorithm may be applied for a pre-determined time, for example for a time sufficient to generate states that can be useful for partitioning the n population variables at 403.

At 403, the classical processor partitions the n population variables into k clusters, where k<n, so that each variable is in exactly one cluster. In at least one implementation, k≤n, In some implementations the n population variables are partitioned relative to a subset of low-energy states S, derived from running the algorithm at 402. For example, if a parallel tempering algorithm was applied at 402, the states encountered by the coldest random walks will have the lowest energy; these states will be selected to partition the n population variables. In at least one implementation, an Unweighted Pair Group Method with Arithmetic Mean (UPGMA) algorithm is used to partition the n population variables into k clusters. Pairwise mutual information is an example of a distance metric that can be used in UPGMA; however, other pairwise symmetric metrics or scores can be used. Alternatively, the n population variables are partitioned relative to a low-energy state s of interest.

At 404, the classical processor contracts each of the k clusters, thus reducing the number of population variables and producing a reduced input to the problem of 402. In at least one implementation, k≤n In some implementations, the classical processor contracts each cluster by clamping all the variables in a cluster based on their value relative to a state s, therefore obtaining k variables representing a reduced input to the problem of 402. The state s may be determined at 402, or it may be created by the classical processor using a heuristic solver based on the clustering determined at 403. Alternatively, the classical processor contracts each cluster based on a set of states, rather than a single state s, for example by averaging within each cluster. In these or other implementations, the contraction may additionally consider the statistics observed within the low-energy states, as well as the energy function restricted to each cluster.

At 405, the classical processor applies a classical algorithm to the problem with the reduced input. In some implementations, a Parallel Tempering algorithm us applies. In at least one implementation, a Simulated Annealing algorithm is applied.

At 406, the classical processor obtains samples $S_r$ from the reduced input after applying the classical algorithm at 405.

At 407, the classical processor expands the samples $S_r$ to obtain a new set of modified states to the original input on n population variables. Where the state s is used at 404 to reduce the input, samples $S_r$ are expanded relative to s by flipping the clusters dictated by the state from $S_r$. In some implementations, samples $S_r$ are expanded based on a set of low-energy states. In these or other implementations, the expansion may additionally consider the statistics observed within the set of low-energy states, as well as the energy function.

At 408, method 400 terminates, until it is, for example, invoked again.

Figure 5:
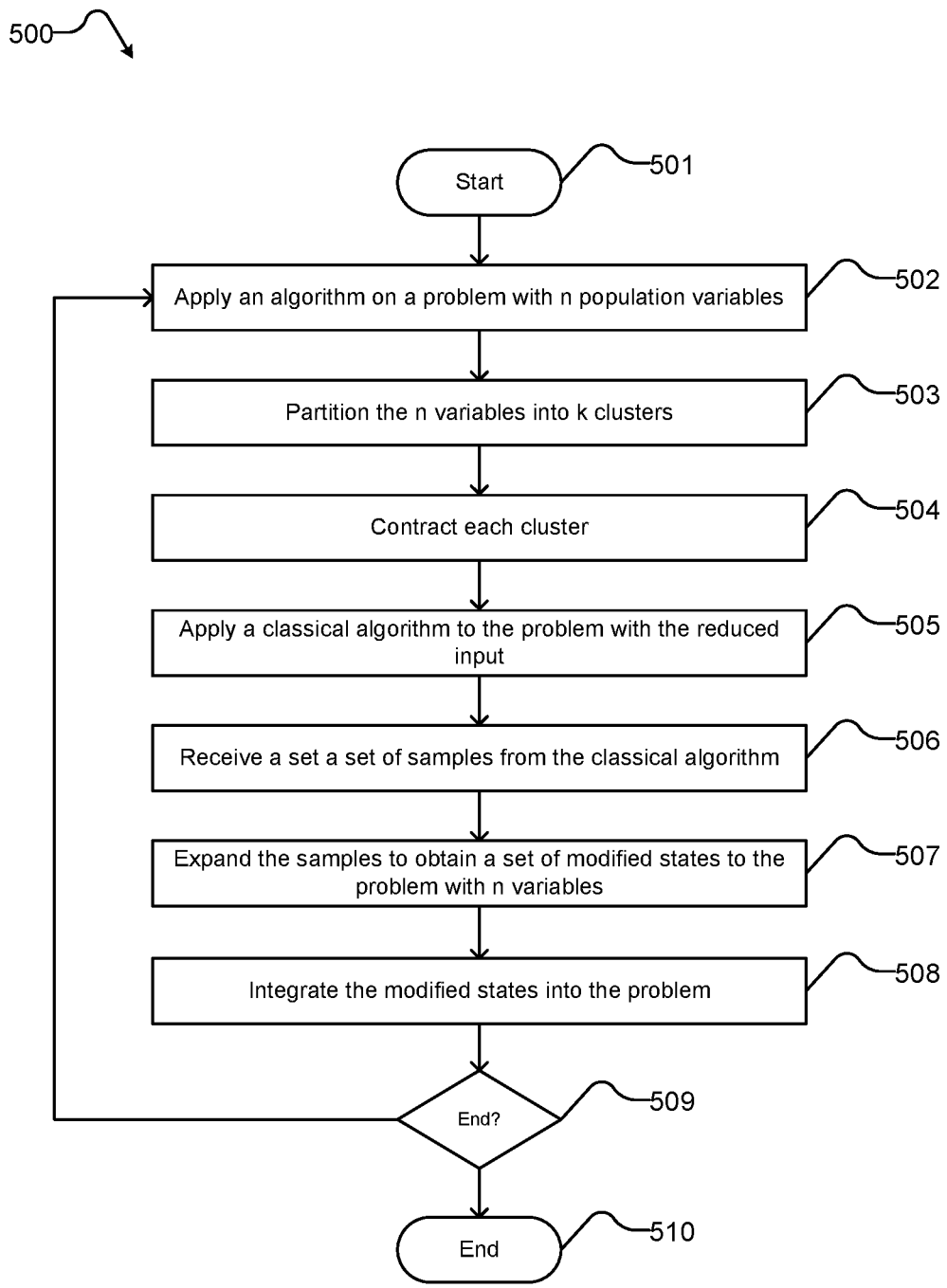
FIG. 5 is a flow diagram of an example iterative method of operation in a classical computer using cluster contraction.

FIG. 5 is a flow diagram of an example iterative method 500 for solving a computational problem using cluster contraction. Method 500 is executed via a classical computing system, comprising at least one non-quantum, or classical, processor. Alternatively, method 500 can be executed via a hybrid computing system, for example hybrid computing system 100, using the classical processor. Method 500 comprises acts 501 to 510; however, a person skilled in the art will understand that the number of acts is an example, and, in some implementations, certain acts may be omitted, further acts may be added, and/or the order of the acts may be changed.

Method 500 starts at 501, for example in response to a call from another routine.

At 502, the classical processor applies an algorithm to a problem having n population variables, as described above with reference to act 402 of method 400.

At 503, the classical processor partitions the n population variables into k clusters, as described above with reference to act 403 of method 400.

At 504, the classical processor contracts each of the k clusters, as described above with reference to act 404 of method 400.

At 505, the classical processor applies a classical algorithm to the problem with the reduced input, as described above with reference to act 405 of method 400.

At 506, the classical processor obtains samples $S_r$ from the reduced input after applying the classical algorithm at 505.

At 507, the classical processor expands the samples $S_r$, as described above with reference to act 407 of method 400.

At 508, the classical processor integrates the modified states into the n population variables.

At 509, the classical processor checks if an exit condition has been met. If an exit condition has been met, control passes to 510, otherwise to 502, where an algorithm is again applied to the problem. An exit condition may be determining whether a measure of the quality of the population variables is satisfied.

At 510, method 500 terminates, until it is, for example, invoked again.

Alternatively, the problem size can be reduced by applying a portfolio of classical solvers to the problem on n variables and obtain at least one sample, or solution, from each of the classical solvers in the portfolio of classical solvers, thus obtaining a reduced-input problem on k variables, where k<n. In at least one implementation, k≤n The classical solvers may all run in parallel and on different classical computer. The reduced-input problem can then be solved on a classical processor using a classical solver to obtain a set of samples based on the reduced input. Alternatively, the reduced input can be solved on a quantum processor based on the reduced input. The set of samples can then be expanded to the original problem size.

Figure 6:
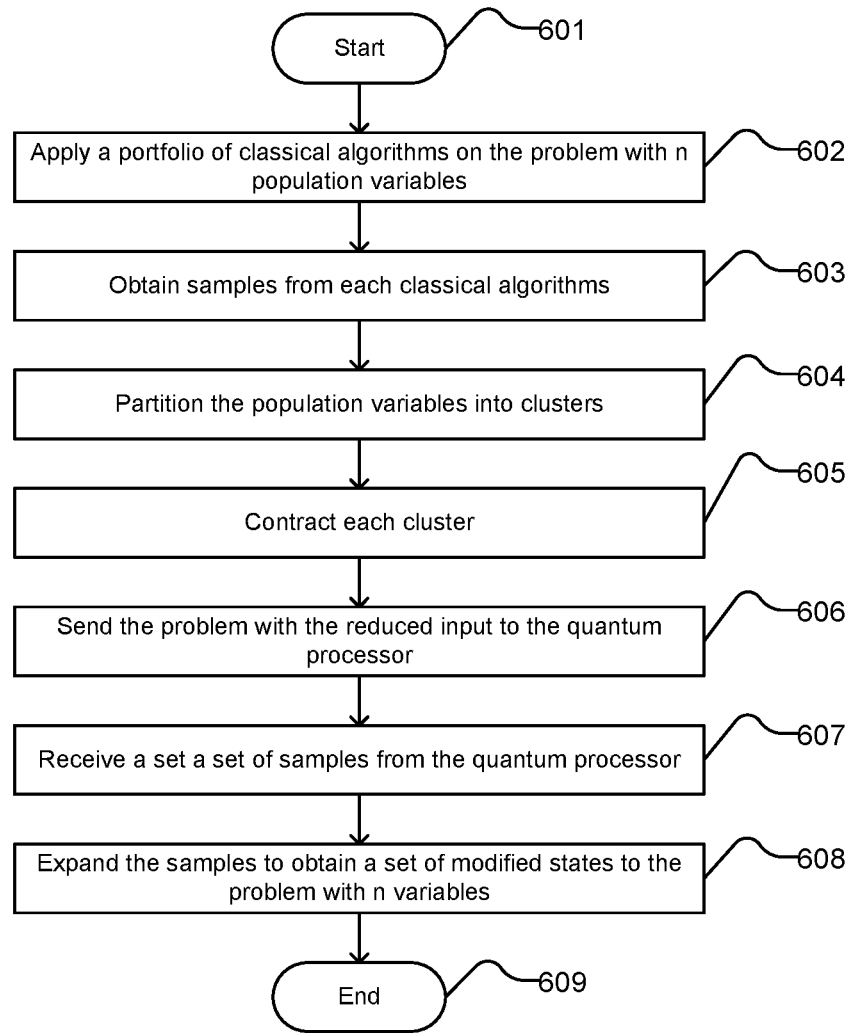
FIG. 6 is a flow diagram of an example method of operation in a hybrid computing system using a portfolio of classical solvers and cluster contraction.

FIG. 6 is a flow diagram of an example method of operation 600 in a hybrid computing system using a portfolio of classical solvers. Method 600 is executed via a hybrid computing system, comprising a quantum processor and a non-quantum, or classical, processor, for example hybrid computing system 100.

Method 600 comprises acts 601 to 609; however, a person skilled in the art will understand that the number of acts is an example, and, in some implementations, certain acts may be omitted, further acts may be added, and/or the order of the acts may be changed.

Method 600 starts at 601, for example in response to a call from another routine.

At 602, the classical processor applies a portfolio of classical algorithms to a problem having n population variables. The problem may be received as part of a set of input at 601. In at least one implementation, the portfolio of classical algorithms comprises Parallel Tempering, Simulated Annealing, and Branch & Bound. The algorithm may be applied for a pre-determined time, for example for a time sufficient to generate states that can be useful for contracting clusters of samples at 605.

At 603, the classical processor obtains at least one sample from each of the classical algorithms.

At 604, the classical processor partitions the n population variables into k clusters based on sample statistics.

At 605, the classical processor contracts each of the k clusters, thus reducing the number of population variables and producing a reduced input to the problem of 602. In some implementations, the classical processor contracts each cluster by clamping all the variables in a cluster based on their value relative to a state s, therefore obtaining k variables representing a reduced input to the problem of 602. The state s may be determined at 602 after running the portfolio of classical algorithms. Alternatively, the classical processor contracts each cluster based on a set of states, rather than a single state s, for example by averaging within each cluster. In these or other implementations, the expansion may additionally consider the statistics observed within the low-energy states, as well as the energy function restricted to each cluster. In at least one implementation, the value of k might be equal to n.

At 606, the classical processor sends the problem with the reduced input to the quantum processor. In some implementations, an embedding algorithm, for example a minor embedding, is applied to the problem with the reduced input generating an embedded problem that can be sent to the quantum processor.

At 607, the quantum processor returns samples $S_r$ from the reduced input.

At 608, the classical processor expands the samples $S_r$ to obtain a new set of modified states to the original input on n population variables. Where the state s is used at 605 to reduce the input, samples $S_r$ are expanded relative to s by flipping the clusters dictated by the state from $S_r$. In some implementations, samples $S_r$ are expanded based on a set of low-energy states. In these or other implementations, the expansion may additionally consider the statistics observed within the low-energy states, as well as the energy function.

At 609, method 600 terminates, until it is, for example, invoked again.

Figure 7:
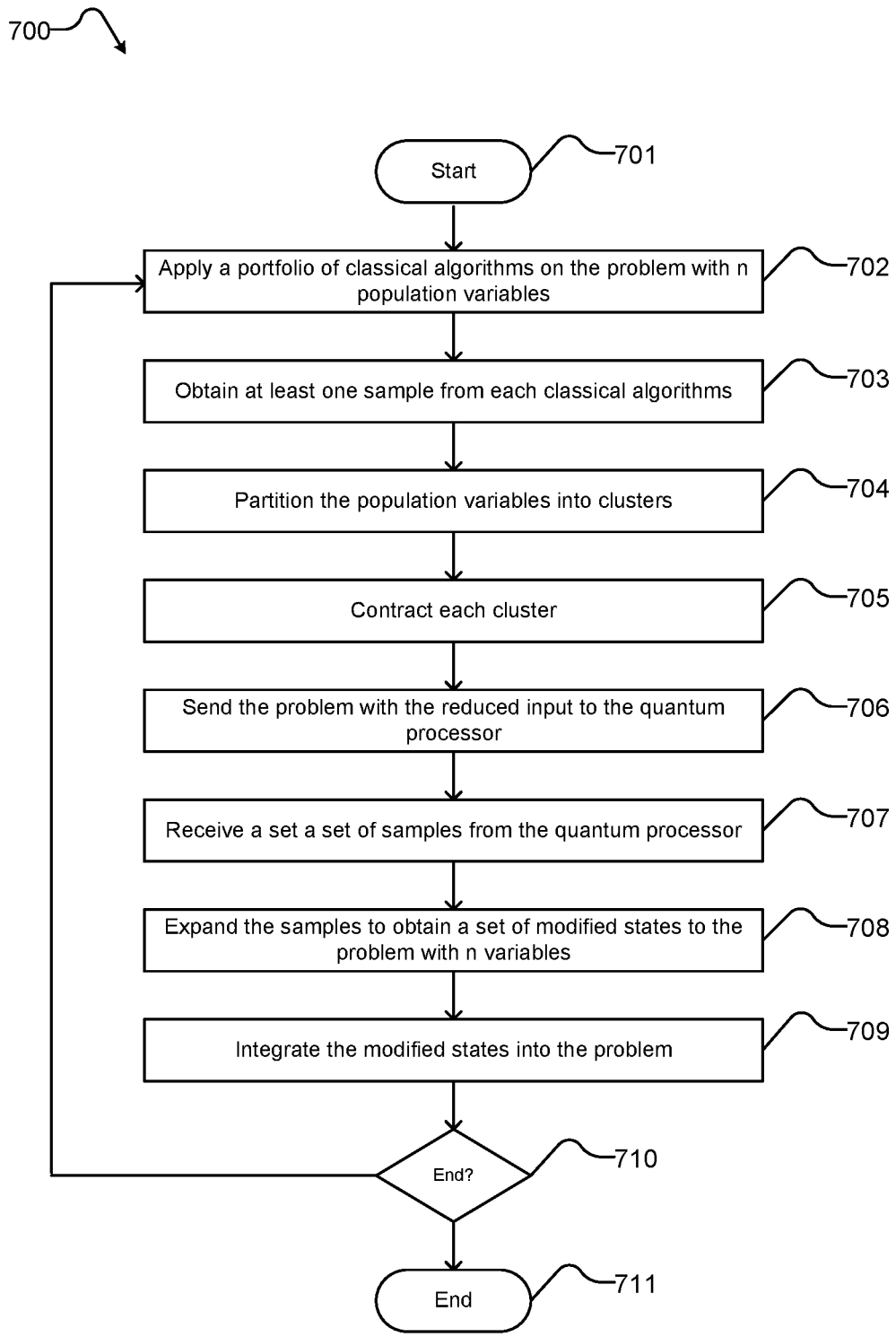
FIG. 7 is a flow diagram of an example iterative method of operation in a hybrid computing system using a portfolio of classical solvers and cluster contraction.

FIG. 7 is a flow diagram of an example iterative method 700 of operation of a hybrid computing system using a portfolio of classical solvers. Method 700 is executed via a hybrid computing system, comprising a quantum processor and a non-quantum, or classical, processor, for example hybrid computing system 100.

Method 700 comprises acts 701 to 711; however, a person skilled in the art will understand that the number of acts is an example and, in some implementations, certain acts may be omitted, further acts may be added, and/or the order of the acts may be changed.

Method 700 starts at 701, for example in response to a call from another routine.

At 702, the classical processor applies a portfolio of classical algorithms to a problem having n population variables, as described above with reference to act 602 of method 600.

At 703, the classical processor obtains at least one sample from each of the classical algorithms, as described above with reference to act 603 of method 600.

At 704, the classical processor partitions the n population variables into k clusters based on sample statistics.

At 705, the classical processor contracts each of the k clusters, as described above with reference to act 605 of method 600.

At 706, the classical processor sends the problem with the reduced input to the quantum processor, as described above with reference to act 606 of method 600.

At 707, the quantum processor returns samples $S_r$ from the reduced input.

At 708, the classical processor expands the samples $S_r$, as described above with reference to act 608 of method 600.

At 709, the classical processor integrates the modified states into the n population variables of the original problem from act 702.

At 710, the classical processor checks if an exit condition has been met. If an exit condition has been met, control passes to 711, otherwise to 702, where the portfolio of classical algorithms is again applied to the problem. An exit condition may be determining whether a measure of the quality of the population variables is satisfied.

At 711, method 700 terminates, until it is, for example, invoked again.

Figure 8:
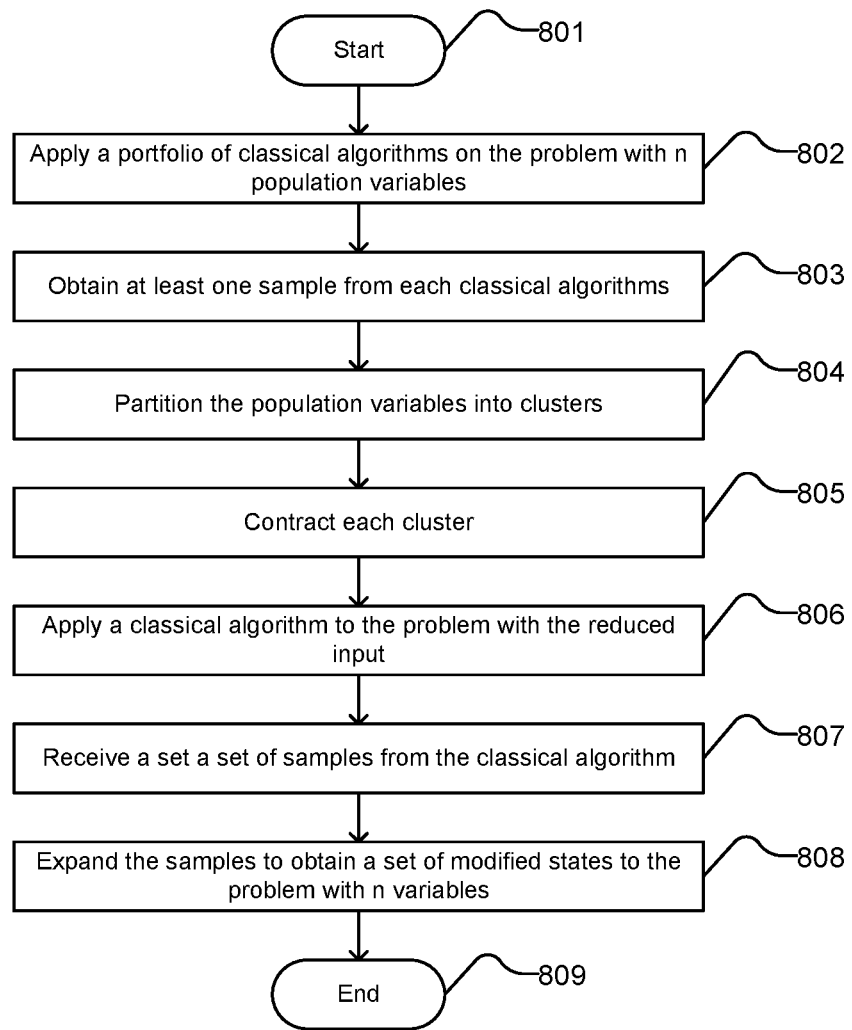
FIG. 8 is a flow diagram of an example method of operation in a classical computer using a portfolio of classical solvers and cluster contraction.

FIG. 8 is a flow diagram of an example method 800 for solving a computational problem using a portfolio of classical solvers. Method 800 is executed via a classical computing system, comprising at least one non-quantum, or classical, processor. Alternatively, method 800 can be executed via a hybrid computing system, for example hybrid computing system 100, using the classical processor. Method 800 comprises acts 801 to 809; however, a person skilled in the art will understand that the number of acts is an example, and, in some implementations, certain acts may be omitted, further acts may be added, and/or the order of the acts may be changed.

Method 800 starts at 801, for example in response to a call from another routine.

At 802, the classical computing system applies a portfolio of classical algorithms to a problem having n population variables. The problem may be received as part of a set of input at 801. In at least one implementation, the portfolio of classical algorithms comprises Parallel Tempering, Simulated Annealing and Branch & Bound. The algorithm may be applied for a pre-determined time, for example for a time sufficient to generate states that can be useful for contracting clusters of samples at 805. The classical solvers may be executed in parallel on separate classical processor.

At 803, the classical processor obtains at least one sample from each of the classical algorithms.

At 804, the classical processor partitions the n population variables into k clusters based on sample statistics.

At 805, the classical processor contracts each of the k clusters, thus reducing the number of population variables and producing a reduced input to the problem of 802. In some implementations, the classical processor contracts each cluster by clamping all the variables in a cluster based on their value relative to a state s, therefore obtaining k variables representing a reduced input to the problem of 802. The state s may be determined at 802 after running the portfolio of classical algorithms. Alternatively, the classical processor contracts each cluster based on a set of states, rather than a single state s, for example by averaging within each cluster. In these or other implementations, the contractions may additionally consider the statistics observed within the low-energy states, as well as the energy function restricted to each cluster. In at least one implementation, the value of k might be equal to n.

At 806, the classical processor applies a classical algorithm to the problem with the reduced input. In some implementations, a Parallel Tempering algorithm is applied. In at least one implementation, a Simulated Annealing algorithm is applied.

At 807, the classical processor obtains samples $S_r$ from the reduced input after applying the classical algorithm at 806.

At 808, the classical processor expands the samples $S_r$ to obtain a new set of modified states to the original input on n population variables. Where the state s is used at 805 to reduce the input, samples $S_r$ are expanded relative to s by flipping the clusters dictated by the state from $S_r$. In some implementations, samples $S_r$ are expanded based on a set of low-energy states. In these or other implementations, the expansion may additionally consider the statistics observed within the low-energy states, as well as the energy function.

At 809, method 800 terminates, until it is, for example, invoked again.

Figure 9:
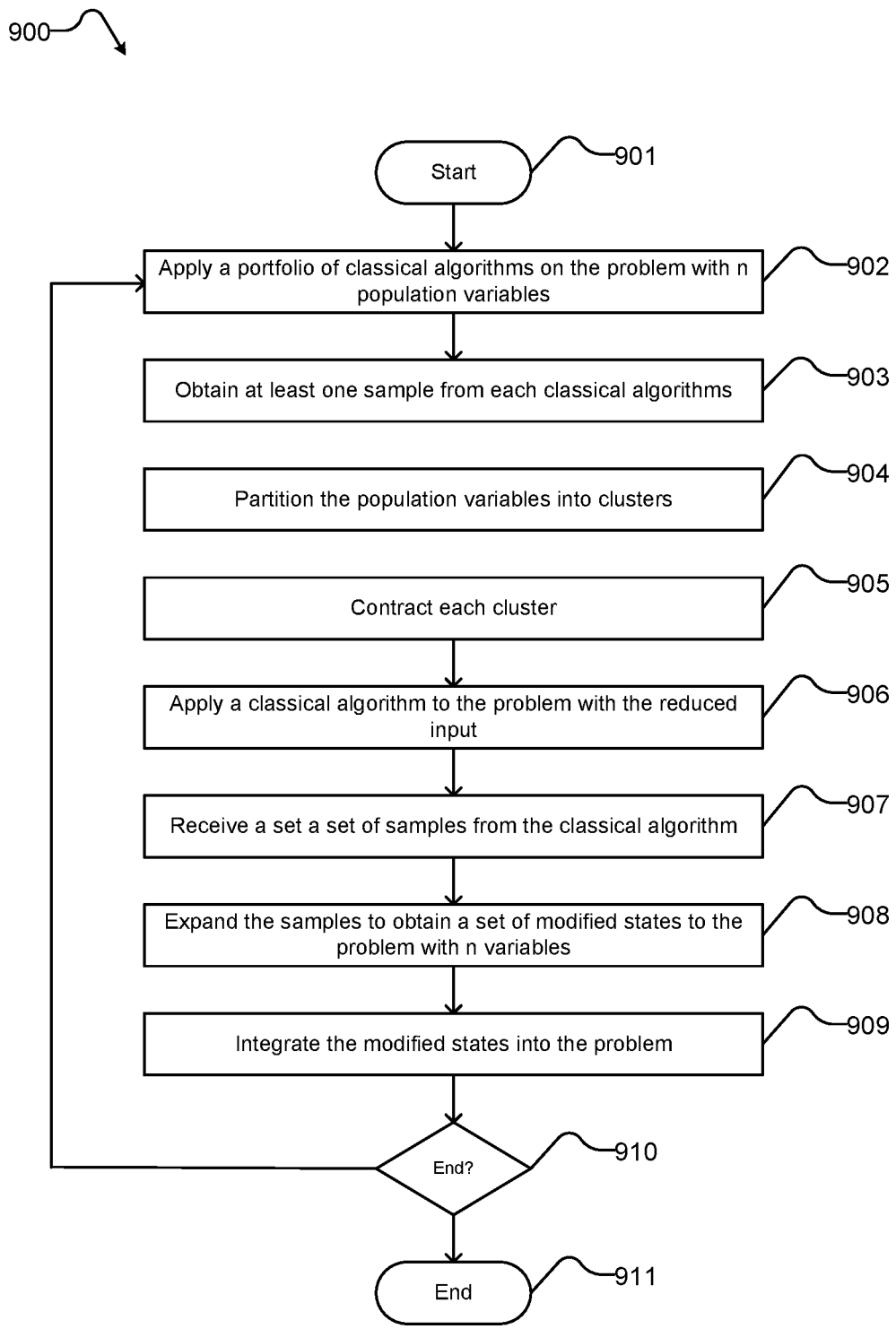
FIG. 9 is a flow diagram of an example iterative method of operation in a classical computer using a portfolio of classical solvers and cluster contraction.

FIG. 9 is a flow diagram of an example iterative method 900 for solving a computational problem using a portfolio of classical solvers. Method 900 is executed via a classical computing system comprising at least one non-quantum, or classical, processor. Alternatively, method 900 can be executed via a hybrid computing system, for example hybrid computing system 100, using the classical processor.

Method 900 comprises acts 901 to 911; however, a person skilled in the art will understand that the number of acts is an example, and, in some implementations, certain acts may be omitted, further acts may be added, and/or the order of the acts may be changed.

Method 900 starts at 901, for example in response to a call from another routine.

At 902, the classical processor applies a portfolio of classical algorithms to a problem having n population variables, as described above with reference to act 802 of method 800.

At 903, the classical processor obtains at least one sample from each of the classical algorithms, as described above with reference to act 803 of method 800.

At 904, the classical processor partitions the n population variables into k clusters based on sample statistics.

At 905, the classical processor contracts each of the k clusters, as described above with reference to act 805 of method 800.

At 906, the classical processor applies a classical algorithm to the problem with the reduced input, as described above with reference to act 806 of method 800.

At 907, the classical processor obtains samples $S_r$ from the reduced input after applying the classical algorithm at 906.

At 908, the classical processor expands the samples $S_r$, as described above with reference to act 808 of method 800.

At 909, the classical processor integrates the modified states into the n population variables of the original problem from act 902.

At 910, the classical processor checks if an exit condition has been met. If an exit condition has been met, control passes to 911, otherwise to 902, where the portfolio of classical algorithms is again applied to the problem. An exit condition may be determining whether a measure of the quality of the population variables is satisfied.

At 911, method 900 terminates, until it is, for example, invoked again.

Certain classes of problems, for example quadratic constrained binary optimization (QCBO) problems, may be not be directly solved with a quantum processor operable as a quantum annealer. A QCBO problem can be converted to a Quadratic Unconstrained Binary Optimization (QUBO) problem by adding large penalty terms; the quantum processor can then be programmed to provide a solution to the QUBO. Adding penalty terms to a QCBO is necessary to ensure that any potential solution to the QUBO that does not satisfy the constraints will incur one or more of the penalty terms, thus directing any ground state of the QUBO to satisfy the constraints.

However, adding penalty terms to a QUBO problem can cause it to be harder to solve. In particular, analog devices, such as quantum annealers, require great precision to operate and the added penalty terms greatly increase the degree of precision needed to solve the problem. Thus, solving a QUBO with added penalty terms might not be feasible on an analog device alone. A hybrid method that leverages an analog processor, such as a quantum annealer, while respecting the added constraints is therefore desirable for solving QCBO.

A Monte Carlo algorithm proposes a variable flip and accepts it with a probability based on the change of energy. A hybrid Monte Carlo algorithm generates multiple variable flips for which the hybrid Monte Carlo algorithm formulates a QUBO problem whose energy corresponds to the resulting energy changes of the combination of the variable flip proposals. Each variable in the QUBO corresponds to a single variable flip acceptance or rejection. The QUBO can then be solved via a quantum processor and the resulting solution is the most likely combination of proposed variable flips to accept. The hybrid Monte Carlo algorithm can be applied to QCBO problems and to other problems where the effect of accepting a subset of proposals can be modeled as a QUBO. For example, the hybrid Monte Carlo algorithm can be applied to Quadratic Problem, Mixed Integer Problems, or Integer Quadratic Programming.

The hybrid Monte Carlo algorithm initially takes a state s as a potential solution to the problem. The state s can be a random state. The hybrid Monte Carlo algorithm then generates a plurality of proposed modifications (e.g., variable flips) to the state s, such that, collectively, the plurality of proposals respect two restrictions. The first restriction is that no two proposals modify the same variable. The second restriction is that no more than two proposals impact a term of the cost function, where the cost function (or energy/fitness function) is expressed as the sum of all terms. The hybrid Monte Carlo algorithm may generate a number k of proposals.

The hybrid Monte Carlo algorithm formulates a QUBO on k variables, such that the energy of the QUBO for a given binary string $s_b$ of length k corresponds to the energy of the original problem with the state s' that results after modifying s by accepting the subset of k proposals represented by $s_b$.

The QUBO can then be programmed into a quantum processor, for example a quantum annealer, or any other QUBO solver, to provide solutions. The solutions are a subset of proposed modifications. Modifying the variables according to the solutions leads to a new state s' as a potential solution to the original problem.

The hybrid Monte Carlo algorithm can iterate generating a new set of proposed modifications, based on the state modified from previous iterations of the algorithm, formulating a QUBO and solving the QUBO via the quantum processor.

Figure 10:
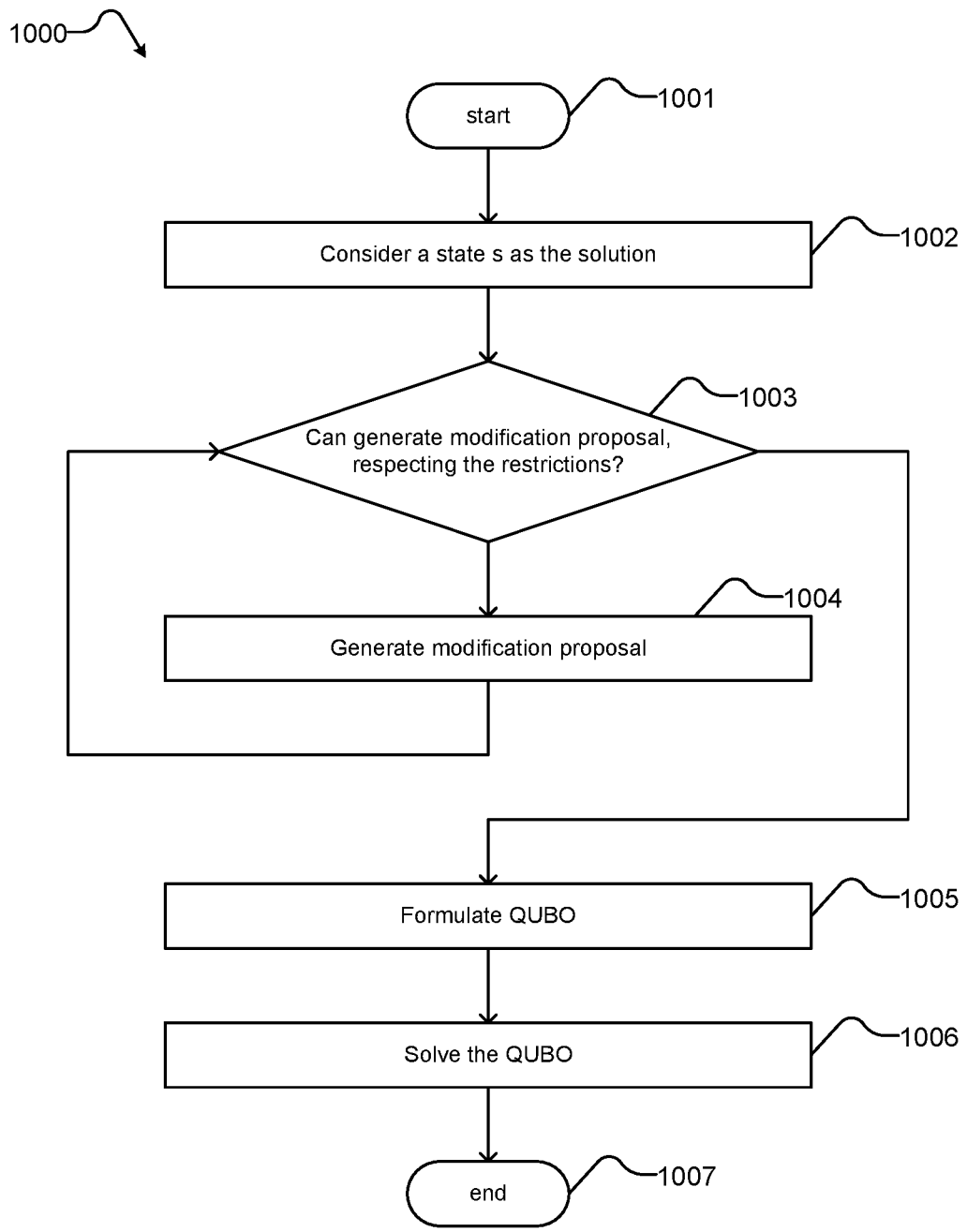
FIG. 10 is a flow diagram of an example method of operation in a hybrid computing system with multiple constraint-based updates.

FIG. 10 is a flow diagram of an example method 1000 of operation of a hybrid computing system with multiple constraint-based updates. Method 1000 executes on a hybrid computing system comprising a quantum processor and a classical processor, for example hybrid computing system 100 of FIG. 1, and will be described with reference to hybrid computing system 100.

Method 1000 comprises acts 1001 to 1007; however, a person skilled in the art will understand that the number of acts is an example, and, in some implementations, certain acts may be omitted, further acts may be added, and/or the order of the acts may be changed.

Method 1000 starts at 1001, for example in response to a call from another routine.

At 1002, hybrid computing system 100 consider a state s as the solution to a problem. The state s may be a random state or as part of a set of inputs.

At 1003, hybrid computing system 100 determines whether it is possible to generate a modification proposal with respect to the state s that that satisfies two restrictions. The restrictions are that no two proposals modify the same variable and that no more than two proposals impact a term of the cost function. The first proposal always satisfies the restrictions, but the union of the current proposal and previously generated proposals may not satisfy both restrictions. If it is possible to generate such a proposal, control passes to 1004, otherwise to 1005.

At 1004, hybrid computing system 100 generates the modification proposal. The proposal may be stored in a memory system for later use. Control passes to 1003 where hybrid computing system 100 determines whether it is possible to generate another proposal that respects the restrictions.

At 1005, hybrid computing system 100 formulates a QUBO on k variables, where k is the number of modification proposals, such that the energy of the QUBO for a given binary string $s_b$ of length k corresponds to the energy of the original problem with the state s' that results after modifying s by accepting the subset of k proposals represented by $s_b$.

At 1006, hybrid computing system 100 causes the QUBO to be solved by quantum processor 124. The solutions from quantum processor 124 are a subset of proposed modifications. Modifying the variables according to the solution lead to a new state s' as a potential solution to the original problem.

At 1007, method 1000 terminates, until it is, for example, invoked again.

Figure 11:
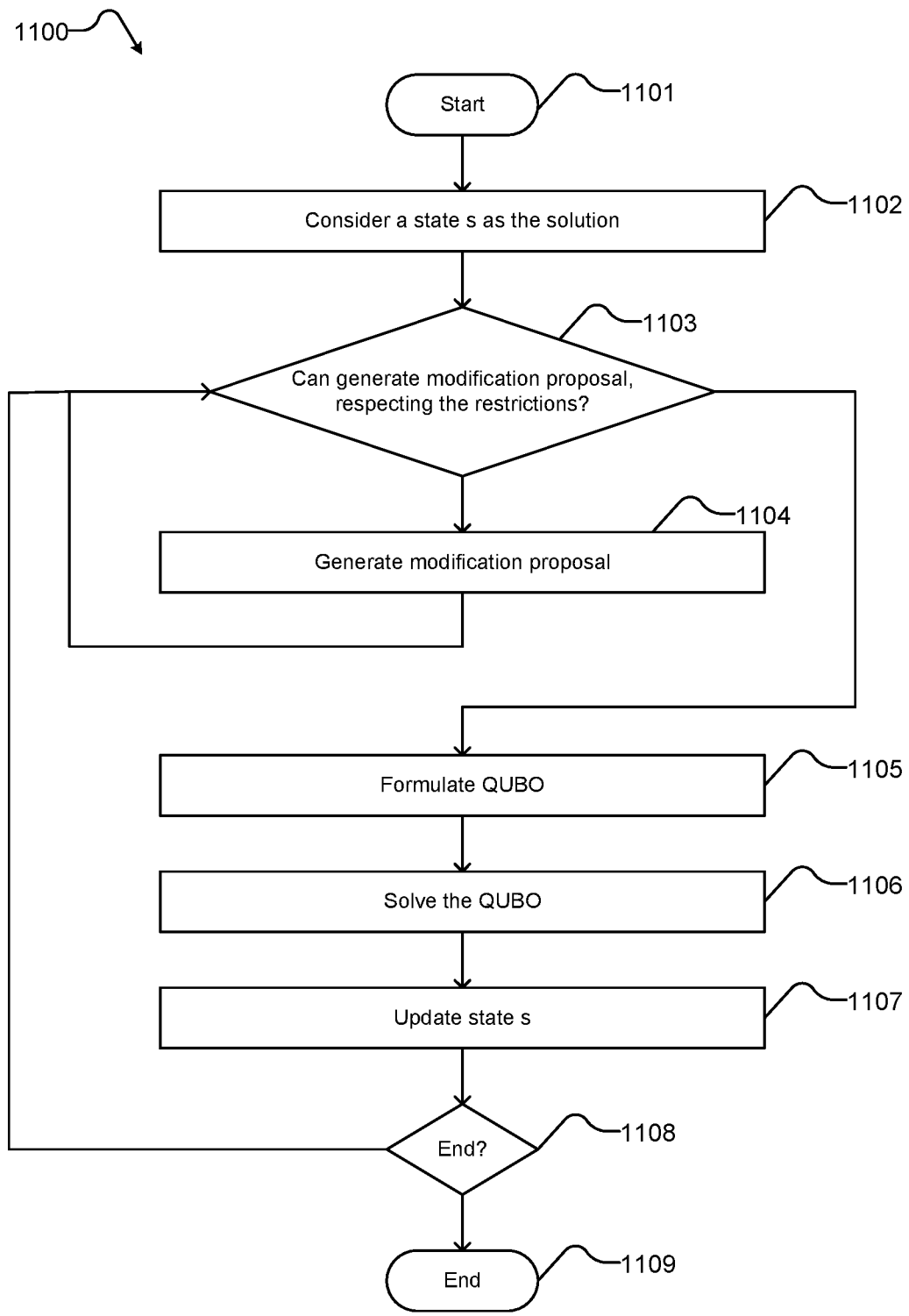
FIG. 11 is a flow diagram of an example iterative method operation in a hybrid computing system with multiple constraint-based updates.
Figure 12:
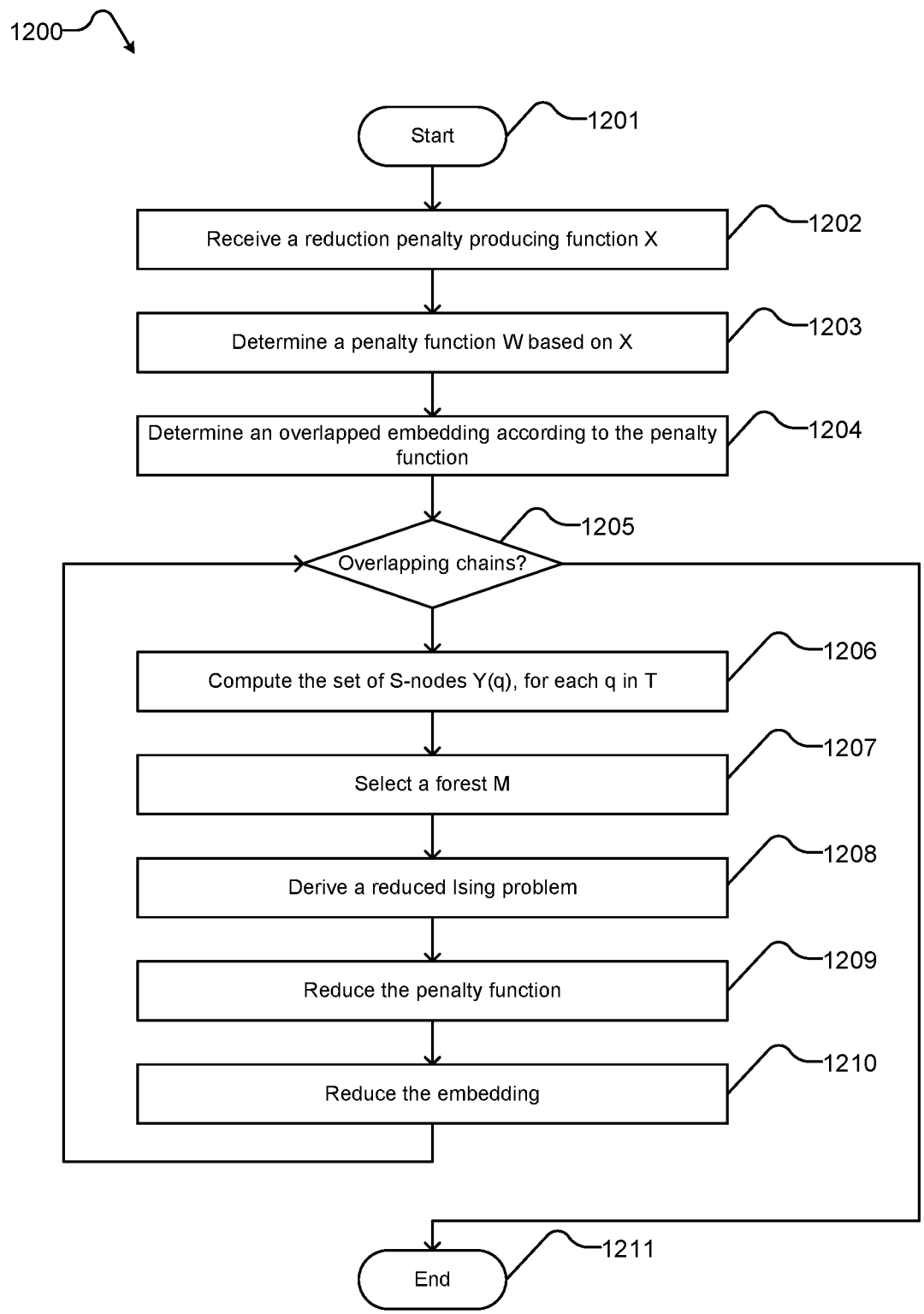
FIG. 12 is a flow diagram of an example method of operation in a hybrid computing system to compute reductions and their embeddings.

FIG. 11 is a flow diagram of an example iterative method 1100 of operation of a hybrid computing system with multiple constraint-based updates.

Method 1100 executes on a hybrid computing system comprising a quantum processor and a classical processor, for example hybrid computing system 100 of FIG. 1, and will be described with reference to hybrid computing system 100.

Method 1100 comprises acts 1101 to 1109; however, a person skilled in the art will understand that the number of acts is an example, and, in some implementations, certain acts may be omitted, further acts may be added, and/or the order of the acts may be changed.

Method 1100 starts at 1101, for example in response to a call from another routine.

At 1102, hybrid computing system 100 consider a state $s_n$ as the solution to a problem, as described above with reference to act 1002 of method 1000.

At 1103, hybrid computing system 100 determines whether it is possible to generate a modification proposal with respect to the state $s_n$ that that satisfies two restrictions, as described above with reference to act 1003 of method 1100.

At 1104, hybrid computing system 100 generates the modification proposal, as described above with reference to act 1004 of method 1000.

At 1105, hybrid computing system 100 formulates a QUBO, as described above with reference to act 1005 of method 1000.

At 1106, hybrid computing system 100 causes the QUBO to be solved by quantum processor 124, as described above with reference to act 1006 of method 1000.

At 1107, hybrid computing system 100 modifies state $s_n$ to a state $s_{n+1}$, where state $s_{n+1}$ is the state resulting after modifying state $s_n$ by accepting the subset of k proposals represented by the solution of the QUBO at act 1106.

At 1108, hybrid computing system 100 determines whether an exit condition has been met. In at least one implementation, the exit condition is the satisfaction of a quality measure of state $s_{n+1}$. In another implementation, the exit condition is the completion of a number of iterations of method 1100.

At 1109, method 1100 terminates, until it is, for example, invoked again.

Algorithms that are executed on a hybrid computing system comprising a quantum processor and a classical processor, for example hybrid computing system 100, may benefit from embedding algorithms to fit a problem into the hardware of the quantum processor.

An example algorithm that embeds a problem into the topology of a quantum processor is based on the following embedding criteria. Given a source graph S and a target graph T, which can represent, for example, the topology of a quantum processor, an embedding ε is defined as a mapping from nodes of S to sets of nodes of T such that 1. For each $v \in V(S)$, the induced subgraph $T[\varepsilon(v)]$ is non-empty and connected, and 2. For all u, $v \in V(S)$ then $\varepsilon(u) \cap \varepsilon(v) = \emptyset$ if and only if $u \neq v$.

The sets ε(v) are called chains.

The second criterion can be relaxed with a tear-up-and-replace operation, as described below.

For a source node $u \in S$,

1. Set $\varepsilon(u) := \{\}$.

2. For each node $q \in T$, define the penalty function $W(u, q) := a^{|\{(v \in S: q \in \varepsilon(v))\}|}$—an exponential function in the number of source nodes currently occupying q.

3. For each S-neighbor v of u, execute a node-weighted variant of Dijkstra's algorithm to compute node distances $D(v, q)$ and parents $P(v, q)$, taking $W(u, q)$ to be the weight of q.

4. For each node $q \in T$, define the root cost estimate $R(q) := \Sigma_{v \sim u} D(v, q)$, where v~u means that v is an S-neighbor of u.

5. Select a node $q_0$ which minimizes $R(q)$ and update $\varepsilon(u) := \{q_0\}$.

6. For each S-neighbor v, construct a path from $q_0$ to $\varepsilon(v)$ through the parents; $q_0 \mapsto P(v, q_0) \mapsto \ldots \mapsto p \in \varepsilon(v)$ and add the path (omitting p) to ε(u).

The above algorithm returns an embedding called an overlapped embedding from the problem defined on a graph S to an embedded problem defined on a graph T. The above algorithm may also be used with an externally supplied overlapped embedding that is heuristically improved.

Given an Ising problem, over the variables $[\sigma_1, \ldots, \sigma_n]$ $$E(\sigma) = \sum_{i=1}^{n} h_i \sigma_i + \sum_{i=1}^{n}\sum_{j=1}^{n} J_{i,j}\sigma_i \sigma_j$$

With $J_{i,i}=0$ for all i, a reduction is a relative assignment of these variables, which represents a restricted subspace of the Ising problem. The reduction ($\sigma_x \equiv \sigma_y$) with $i \neq j$ produces a reduced Ising problem over n−1 variables, which can be computed with via symbolic simplification of E. A person skilled in the art will understand that an Ising problem can be translated into a QUBO.

The systems and method of the present disclosure describe an algorithm with computes embeddings and reductions in a feedback process, in order to find embeddable reductions which minimize a penalty function. The penalty function may be supplied by a user or by another method or algorithm.

FIG. 12 is a flow diagram of an example method 1200 of operation in a hybrid computing system to compute reductions and their embeddings. Method 1200 executes on a hybrid computing system comprising a quantum processor and a classical processor, for example hybrid computing system 100 of FIG. 1, and will be described with reference to hybrid computing system 100. Method 1200 may be employed as part of methods 200 (FIG. 2), 300 (FIG. 3), 400 (FIG. 4), 500 (FIG. 5), 600 (FIG. 6), 700 (FIG. 7), 800 (FIG. 8), and 900 (FIG. 9) to reduce the input size of a problem and embed it into the quantum processor.

Method 1200 comprises acts 1201 to 1211; however, a person skilled in the art will understand that the number of acts is an example, and, in some implementations, certain acts may be omitted, further acts may be added, and/or the order of the acts may be changed.

Method 1200 starts at 1201, for example in response to a call from another routine.

At 1202, hybrid computing system 100 receives a reduction penalty producing function X. Reduction penalty producing function X assigns each ordered pair (u, v) of S-nodes a penalty X(u, v). Reduction penalty producing function X may be received as part of a set of inputs to method 1200.

At 1203, hybrid computing system 100 determines a new penalty function $W'(u, q) := \alpha^{\sum_{v: q \in \epsilon(v)} X(u,v)}$, based on the reduction penalty producing function X of 1202.

At 1204, hybrid computing system 100 determines an overlapped embedding ε of S to T, according to the penalty function W' of 1203. Hybrid computing system 100 may use a heuristic embedding to produce the overlapped embedding.

At 1205, hybrid computing system 100 determines whether the overlapped embedding e determined at 1204 contains overlapping chains. If e contains overlapping chains, control passes to 1206, otherwise to 1211 where method 1200 terminates.

At 1206, hybrid computing system 100 computes the set of S-nodes Y(q)={v: q∈ε(v)} for each T-node q.

At 1207, hybrid computing system 100 selects a forest M of edges from graph G, where G is defined as a graph with edges (u, v), if {u, v} ⊂ Y(q), for any q and with edge weight 1−X(u, v). Hybrid computing system 100 may select forest M according to several techniques. In one implementation, M may be a singleton containing a single edge, selected at random with distribution according to edge weight. Alternatively, M may be a maximum-weight matching of G. In another implementation, M may be a forest constructed by adding edges randomly, with probability according to edge weight. In yet another implementation, the edge weight will be further augmented by the size of ε(u)∪ε(v), the diameter of the induced graph T[ε(u)∪ε(v)], or a more complex metric predicting the performance of the merged chain.

At 12008, hybrid computing system 100 determines a reduced Ising problem. For each (a, b)∈M, hybrid computing system 100 assigns ($\sigma_a \equiv \equiv \sigma_b$) and simplifies b. Hybrid computing system 100 may select the signs according to a plurality of techniques. In one implementation, where there is an available corpus of historical samples, a single sample is taken and the sign of each relation is selected based on the sample. Alternatively, where there is an available corpus of historical samples, the sign of each relation is chosen from the relations seen in that corpus, distributed according to the sample energies of each relation, ($\sigma_a \equiv \sigma_b$) versus ($\sigma_a \equiv -\sigma_b$). In yet another implementation, when the problem has already been reduced, for example, in successive iterations of method 1200, hybrid computing system 100 collects a corpus of samples from an auxiliary solver and determines the sign of each relation according to one of the techniques above. In at least one implementation, the choice of edge and sign is made in tandem by selecting those edges and signs that minimize the largest magnitude $h_i$ and $J_{i,j}$ in the Hamiltonian of the reduced Ising problem. In these or other implementations, the contractions may additionally consider the statistics observed within the low-energy states, as well as the energy function restricted to each cluster.

At 12009, hybrid computing system 100, reduces the penalty function. Hybrid computing system 100 may reduce X according to several techniques. In one implementation, for each (a, b) of M, hybrid computing system 100 sets X(a, x):=X(a, x)+X(b, x) and X(x, b) X(x, a)+X(x, b), normalized to the interval (0,1). Alternatively, when X is computed from a corpus of samples, hybrid computing system 100 filters the corpus according to the sign choice of 1208 and recomputes X on the reduced corpus. In yet another implementation, hybrid computing system 100 computes samples from the reduced Ising problem of 1208 via an auxiliary solver and recompute X from the obtained samples.

At 1210, hybrid computing system 100 reduces embedding ε. Hybrid computing system 100 may reduce embedding ε according to several different techniques. In one implementation, hybrid computing system 100 sets ε(a):=ε(a)∪ε(b), for each (a, b) of M, then improves embedding ε via a heuristic solver for the reduced Ising problem of 1208. Alternatively, hybrid computing system 100 determines a new embedding ε, where in some cases the new embeddign may be an overlapped embedding, via a heuristic solver.

At 12011, method 1200 terminates, until it is, for example, invoked again.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for example purposes only and may change in alternative examples. Some of the example acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the example methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Pat. No. 7,533,068, U.S. Provisional Application No. 62/793,694, U.S. Provisional Application No. 62/841,533, and U.S. Provisional Application No. 62/860,972.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation of a hybrid computing system, the hybrid computing system comprising a quantum processor and a classical processor, the method comprising:
generating a plurality of variable modification proposals relative to a state s on a problem via the classical processor, wherein no two proposals modify the same variable and no more than two proposals impact a term of a Quadratic Unconstrained Binary Optimization problem's cost function;
formulating a Quadratic Unconstrained Binary Optimization problem corresponding to an energy change of accepting a subset of the plurality of variable modification proposals via the classical processor; and
solving the Quadratic Unconstrained Binary Optimization problem via the quantum processor.

2. The method of claim 1 wherein generating a plurality of variable modification proposals on a problem includes generating a plurality of variable modification proposals on a problem consisting of one of: a Quadratic Constrained Binary Optimization problem and an Integer Quadratic Programming problem.

3. The method of claim 1 wherein generating a plurality of variable modification proposals relative to a state s includes generating a plurality of variable modification proposals on a problem relative to a random state s.

4. The method of claim 1 further comprising modifying the state s by accepting the subset of the plurality of variable modification proposals specified by solving the Quadratic Unconstrained Binary Optimization problem; and iteratively repeating, until an exit condition has been met:
generating a plurality of variable modification proposals relative to a state $s_{n-1}$ via the classical processor;
formulating a Quadratic Unconstrained Binary Optimization problem corresponding to an energy change of accepting a subset of the variable modification proposals via the classical processor;
solving the Quadratic Unconstrained Binary Optimization problem via the quantum processor; and
modifying the state $s_{n-1}$ to a state $s_n$ by accepting the subset of the proposals specified by solving the Quadratic Unconstrained Binary Optimization problem.

5. The method of claim 4 further comprising determining whether the exit condition has been met.

6. The method of claim 5 wherein determining whether the exit condition has been met includes determining whether at least one condition from the group of: a number of iterations and the state $s_n$ satisfying a measure of quality, has been met.

7. A hybrid computing system, the hybrid computing system comprising a classical processor and a quantum processor, the classical processor operable to:
generate a plurality of variable modification proposals relative to a state s on a problem, wherein no two proposals modify the same variable and no more than two proposals impact a term of a Quadratic Unconstrained Binary Optimization problem's cost function;
formulate a Quadratic Unconstrained Binary Optimization problem corresponding to an energy change of accepting a subset of the plurality of variable modification proposals; and
cause the quantum processor to solve the Quadratic Unconstrained Binary Optimization problem.

8. The system of claim 7 wherein the problem is at least one of: a Quadratic Constrained Binary Optimization problem and an Integer Quadratic Programming problem.

9. The system of claim 7 wherein the state s is a random state s.

10. The system of claim 7 wherein the classical processor is further operable to modify the state s by accepting the subset of the plurality of variable modification proposals specified by solving the Quadratic Unconstrained Binary Optimization problem; and iteratively repeat, until an exit condition has been met:
generate a plurality of variable modification proposals relative to a state $s_{n-1}$;
formulate a Quadratic Unconstrained Binary Optimization problem corresponding to the an energy change of accepting a subset of the variable modification proposals;
cause the quantum processor to solve the Quadratic Unconstrained Binary Optimization problem; and
modify the state $s_{n-1}$ to a state $s_n$ by accepting the subset of the proposals specified by solving the Quadratic Unconstrained Binary Optimization problem.

11. The system of claim 10 further comprising the classical processor operable to determine whether the exit condition has been met.

12. The system of claim 11 wherein the classical processor is operable to determine whether one of a group of exit conditions comprising: an elapsed number of iterations and the state $s_n$ satisfying a measure of quality, has been met.

* * * * *